(12) United States Patent
Chen et al.

(10) Patent No.: US 12,250,907 B1
(45) Date of Patent: Mar. 18, 2025

(54) SELF-PROPELLED RESIDUAL FILM RECYCLING INTEGRATED MACHINE

(71) Applicants: JIANGSU UNIVERSITY, Zhenjiang (CN); SHIHEZI UNIVERSITY, Xinjiang (CN)

(72) Inventors: Xuegeng Chen, Zhenjiang (CN); Maile Zhou, Zhenjiang (CN); Limin Yan, Xinjiang (CN); Haojun Wen, Xinjiang (CN); Xinzhong Wang, Zhenjiang (CN); Haixiao Gou, Xinjiang (CN); Jianjun Yin, Zhenjiang (CN); Yan Zhao, Xinjiang (CN)

(73) Assignees: JANGSU UNIVERSITY, Zhenjiang (CN); SHIHEZI UNIVERSITY, Xinjiang (CN)

( * ) Notice: Subject to any disclaimer, the term of this patent is extended or adjusted under 35 U.S.C. 154(b) by 0 days.

(21) Appl. No.: 18/749,787

(22) Filed: Jun. 21, 2024

Related U.S. Application Data

(63) Continuation of application No. PCT/CN2024/085249, filed on Apr. 1, 2024.

(30) Foreign Application Priority Data

Jan. 25, 2024 (CN) .......................... 202410100699.2

(51) Int. Cl.
*A01G 13/02* (2006.01)
*A01B 43/00* (2006.01)
*A01F 15/07* (2006.01)

(52) U.S. Cl.
CPC ............ *A01F 15/071* (2013.01); *A01B 43/00* (2013.01); *A01G 13/0287* (2013.01); *A01F 2015/0745* (2013.01); *A01F 2015/078* (2013.01); *A01G 2013/0218* (2013.01)

(58) Field of Classification Search
CPC ................ A01B 43/00; A01G 13/0287; A01G 2013/0218
See application file for complete search history.

(56) References Cited

FOREIGN PATENT DOCUMENTS

| CN | 104885604 A | * | 9/2015 | ............. A01B 43/00 |
| CN | 108513744 A | * | 9/2018 | ............. A01B 43/00 |
| CN | 106416630 B | * | 11/2019 | ............. A01B 43/00 |
| CN | 210016978 U | * | 2/2020 | |

(Continued)

*Primary Examiner* — Stephen F. Gerrity
(74) *Attorney, Agent, or Firm* — Troutman Pepper Locke LLP; Christopher C. Close, Jr.

(57) ABSTRACT

A self-propelled residual film recycling integrated machine is provided, which includes a straw crushing device, a picking and impurity cleaning device, a cab, an air intake system, a film removing and conveying device, a round bale baler, a suspension system, a traveling chassis, and a film unloading bracket. The straw crushing device is assembled at a front end of the traveling chassis in a three-point suspension mode, the picking and impurity cleaning device is installed at a belly of the traveling chassis, and the film removing and conveying device is installed diagonally upwards and backwards of the picking and impurity cleaning device. The round bale baler is installed at a tail of the traveling chassis and is behind the film removing and conveying device, the film unloading bracket is installed below the round bale baler, and the suspension system is arranged on the traveling chassis.

19 Claims, 14 Drawing Sheets

(56) References Cited

FOREIGN PATENT DOCUMENTS

| CN | 111771516 | A | * | 10/2020 | ............. | A01B 43/00 |
|---|---|---|---|---|---|---|
| CN | 112088597 | A | * | 12/2020 | ............. | A01B 43/00 |
| CN | 114916265 | A | * | 8/2022 | ............. | A01B 43/00 |
| CN | 115226424 | A | * | 10/2022 | ............. | A01B 43/00 |
| CN | 116636331 | A | * | 8/2023 | ............. | A01B 43/00 |
| CN | 116762504 | A | * | 9/2023 | ............. | A01B 43/00 |

* cited by examiner

SELF-PROPELLED RESIDUAL FILM RECYCLING INTEGRATED MACHINE

CROSS REFERENCE TO RELATED APPLICATION

This application is a continuation of International Patent Application No. PCT/CN2024/085249, filed on Apr. 1, 2024, which claims the priority of Chinese Patent Application No. 202410100699.2 entitled "SELF-PROPELLED RESIDUAL FILM RECYCLING INTEGRATED MACHINE" filed with the Chinese Patent Office on Jan. 25, 2024, which is incorporated herein by reference in its entirety.

TECHNICAL FIELD

The present disclosure relates to the field of agricultural machinery, and relates to a residual film recycling technology, in particular to a self-propelled residual film recycling integrated machine.

BACKGROUND

The agronomy of film mulching planting has a long history, which can effectively preserve heat and save water and increase production and income in arid and low temperature regions. With the extensive popularization and application of plastic film planting agronomy, the amount of plastic film used in China has reached 1.45 million tons per year, covering an area of about 300 million mu, both of which are the first in the world. However, the plastic film is not easy to degrade naturally, and the residual film stranded in farmland affects both the growth and development of crops and the mechanized operation process such as tillage, management and harvesting, and has now led to serious residual film pollution in farmland. Therefore, the recycling of residual film in the farmland is imminent.

Manual recycling of residual film is time-consuming and laborious, and mechanized farmland residual film recycling includes straw crushing, residual film pick-up, impurity cleaning, rolling and baling. The existing farmland residual film recycling equipment is mainly a traction-type residual film recycling machine, which requires a tractor as power during the operation, leading to not only low operation efficiency, poor stability and high impurity content, but also difficulty in meeting the technical indicators of residual film recycling. Therefore, there is a need to provide novel farmland residual film recycling equipment, so as to overcome the defects on the existing traction residual film recycling machine.

SUMMARY

The embodiments aim to provide a self-propelled residual film recycling integrated machine, which can carry out residual film recycling without a tractor for traction or suspension by equipping with a cab, a power system, a traveling system, a steering system and a braking system by itself, has the advantages of high operation efficiency, strong stability, low impurity content, and capability of meeting various technical indicators of residual film recycling, and can solve the problems that the existing traction type residual film recycling machine requires a tractor as power during operation, the operation efficiency is low, the stability is poor, the impurity content is high, and various technical indicators of residual film recycling are difficult to satisfy.

To achieve the objective above, the present disclosure employs the following technical solution.

A self-propelled residual film recycling integrated machine includes:
- a traveling chassis, where a power system, a traveling system, a steering system and a braking system are equipped on the traveling chassis;
- a cab, where the cab is arranged on the traveling chassis;
- a straw crushing device, where the straw crushing device is arranged at a front end of the traveling chassis, and is configured to crush straw and discharges crushed straw back to field on one side of the machine;
- a picking and impurity cleaning device, where the picking and impurity cleaning device is arranged at a belly of the traveling chassis, and is configured to lift a film, pick up a residual film and clearing away impurities generated when the film is picked up;
- a film removing and conveying device, where the film removing and conveying device is arranged diagonally upwards and backwards of the picking and impurity cleaning device, and is configured to receive the residual film picked up by the picking and impurity cleaning device, and to clear away soil dirt on the residual film; and
- a round bale baler, where the round bale baler is arranged at a tail of the traveling chassis, and is configured to receive the residual film after the soil dirt is removed by the film removing and conveying device, and to bale the residual film into a roll to form a residual film bale.

Alternatively, the straw crushing device is assembled at the front end of the traveling chassis in a three-point suspension mode.

Alternatively, the self-propelled residual film recycling integrated machine further includes a suspension system. The suspension system includes a suspension connecting rod mechanism and lift cylinders. One end of each of the lift cylinders is connected with a frame body of the traveling chassis, and an other end of each of the lift cylinders is connected with the suspension connecting rod mechanism. The picking and impurity cleaning device is connected with the suspension connecting rod mechanism; the lift cylinders are configured to control the picking and impurity cleaning device to lift and lower, and the suspension connecting rod mechanism is configured for achieving anywhere profiling of the picking and impurity cleaning device.

Alternatively, film removing and conveying device is entirely fixedly connected with the picking and impurity cleaning device, and the film removing and conveying device is able to be lifted and lowered under drive of the lift cylinders.

Alternatively, the picking and impurity cleaning device includes a rack, and an impurity cleaning and conveying device, a picking drum and a film lifting tooth assembly are sequentially arranged on the rack from front to back.

The film lifting tooth assembly is located diagonally downwards the picking drum, and includes a film lifting pole and multiple film lifting teeth arranged on the film lifting pole. The multiple film lifting teeth and picking teeth on the picking drum are arranged in a mutual staggered manner. The multiple film lifting teeth are configured for penetrating the soil and lifting the residual film, and the picking teeth extending from the picking drum are configured for further lifting the residual film that has been lifted by the multiple film lifting teeth and conveying the residual film to the film removing and conveying device.

The impurity cleaning and conveying device includes an auger and a film blocking pole. The film blocking pole is assembled between the auger and the picking drum and is configured for preventing the residual film from entering the auger, and the auger is configured to convey impurities discharged when the residual film is lifted to one side of the machine.

Alternatively, the picking and impurity cleaning device further includes a front limiting roller, and a rear limiting roller. The front limiting roller and the rear limiting roller are arranged on the rack at an equal height, the front limiting roller is located in front of the impurity cleaning and conveying device, the rear limiting roller is located behind the film lifting tooth assembly, and the front limiting roller and the rear limiting roller are configured to limit a buried depth of the film lifting tooth assembly and a buried depth of the picking teeth, respectively.

Alternatively, the multiple film lifting teeth are arranged on the film lifting pole in a form of one wide row and three narrow rows alternated, the wide row is matched with a crop planting row, and the three narrow rows are matched with crop planting row spacings.

Alternatively, the film removing and conveying device includes a film removing fan, an exhaust hood, and a conveying and impurity cleaning device. A feed port of the film removing fan is attached to a discharge port of the picking and impurity cleaning device. The conveying and impurity cleaning device includes a vibration belt with meshes, and a vibration device arranged below the vibration belt. A discharge port of the film removing fan is connected with the vibration belt. The exhaust hood is arranged above the vibration belt and is behind the discharge port of the film removing fan. A residual film conveying channel is formed between the exhaust hood and the vibration belt.

Alternatively, the film removing fan and the picking drum rotate in a same direction, and a rotating speed of the film removing fan is greater than a rotating speed of the picking drum.

Alternatively, the round bale baler includes a bottom belt, a back belt, and a baling housing. The baling housing is connected with a frame body of the traveling chassis; both the bottom belt and the back belt are arranged in the baling housing, and the bottom belt and the back belt are arranged at an acute angle 8. The bottom belt is attached to a discharge port of the film removing and conveying device. An operating speed of the back belt is greater than an operating speed of the bottom belt, and the back belt is configured for turning the residual film on the bottom belt into a roll, so as to form the residual film bale.

Alternatively, a top end of the baling housing is hinged with the frame body of the traveling chassis, and a bottom end of the baling housing is connected with the frame body of the traveling chassis through an unbaling cylinder. The unbaling cylinder is configured for applying a pushing force to the bottom end of the baling housing to make the baling housing overturn around a hinge axis at a top of the baling housing to make the residual film bale freely fall from the round bale baler.

Alternatively, the self-propelled residual film recycling integrated machine further includes a film unloading bracket. The film unloading bracket is arranged at the tail of the traveling chassis and is located below the round bale baler, and the film unloading bracket is configured for receiving the residual film bale unloaded from the round bale baler.

Alternatively, the film unloading bracket includes a turnover cylinder, a bracket and a turnover frame. The bracket is arranged at a tail end of the traveling chassis. The turnover frame is arranged on the bracket, and a tail end of the turnover frame is hinged with the bracket. The turnover cylinder is connected between the tail end of the turnover frame and the bracket. The turnover cylinder is configured for applying a pulling force to the tail end of the turnover frame to make the turnover frame overturn downwards around a hinge axis at the tail end of the turnover frame to unload the residual film bale from the turnover frame.

Alternatively, the self-propelled residual film recycling integrated machine further includes an air intake system. The air intake system includes a ventilation duct, an air inlet of the ventilation duct is arranged at an front upper of the cab, and an air outlet of the ventilation duct communicates with an air inlet of an engine on the traveling chassis to provide clean air for the engine.

Alternatively, the cab is further assembled with an auxiliary driving system based on Beidou navigation, which is able to achieve a switching between unmanned driving and human-machine combined driving.

Alternatively, the cab is further assembled with an operation quality monitoring system, which is configured to record a traveling track in an operation process and to perform video recording and storage of earth surface operation quality.

Compared with the prior art, the embodiments have the following technical effects.

The self-propelled residual film recycling integrated machine provided by the embodiments is novel and reasonable in structure, the self-propelled residual film recycling integrated machine can achieve the combined operation of plastic film recycling in season without a tractor for traction or suspension by providing the cab and equipping the power system, the traveling system, the steering system and the braking system on a traveling chassis. Moreover, the residual film baling and recycling integrated technical route can achieve nine operations procedures, such as straw crushing and returning to the field, edge film lifting, soil dirt removal, wide-row film lifting, plastic film pickup, plastic film removing by a fan, residual film conveying, soil removing of residual film and residual film baling, at one time, thus achieving the integration of equipment intelligent self-driving, straw crushing and returning to the field and serialized residual film recycling procedures, and forming a set of high-performance self-propelled residual film recycling machine. The high-performance self-propelled residual film recycling machine has the advantages of high operation efficiency, strong stability and low impurity content, and can meet various technical indicators of residual film recycling, and solve the problems that the existing traction type residual film recycling machine requires a tractor as power during operation, the operation efficiency is low, the stability is poor, the impurity content is high, and various technical indicators of residual film recycling are difficult to satisfy.

BRIEF DESCRIPTION OF THE DRAWINGS

To describe the technical solutions of the embodiments of the present disclosure or in the prior art more clearly, the following briefly introduces the drawings required for describing the embodiments. Apparently, the drawings in the following description show merely some embodiments of the present disclosure, and those of ordinary skill in the art may still derive other drawings from these drawings without creative efforts.

Figure 1:
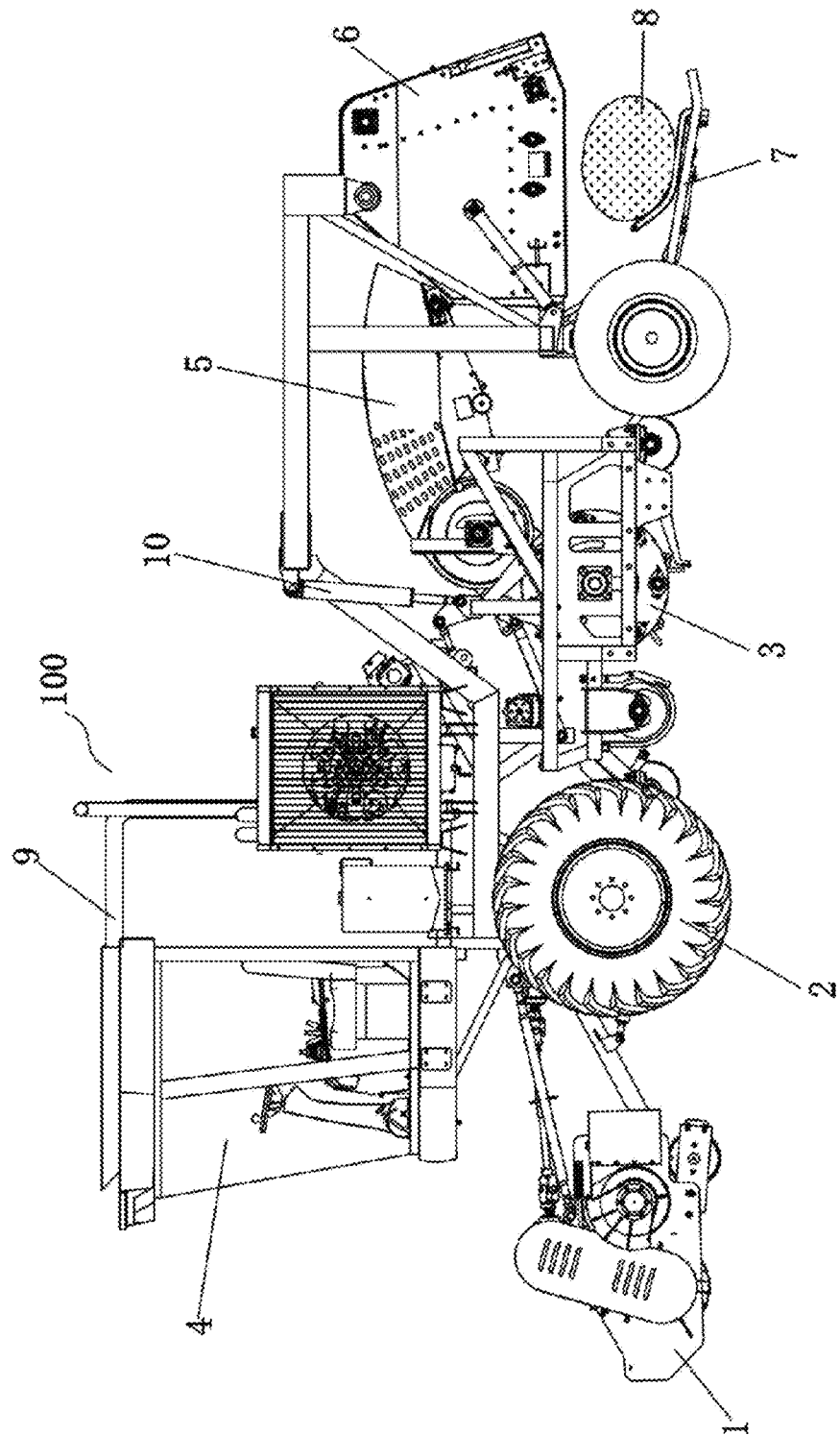
FIG. 1 is a structural schematic diagram of a whole machine of a self-propelled residual film recycling integrated machine according to an embodiment of the present disclosure.

LIST OF THE REFERENCE CHARACTERS 100 self propelled residual film recycling integrated machine; 1 straw crushing device; 2 traveling chassis; 3 picking and impurity cleaning device; 31 front limiting roller; 32 impurity cleaning and conveying device; 321 auger; 322 film blocking pole; 33 picking drum; 34 film lifting tooth assembly; 341 film lifting tooth; 342 film lifting pole; 35 rear limiting roller; 36 rack; 4 cab; 5 film removing and conveying device; 51 film removing fan; 52 exhaust hood; 53 conveying and impurity cleaning device; 531 vibration device; 532 vibration belt; 6 round bale baler; 61 bottom belt; 62 back belt; 63 baling housing; 7 film unloading bracket; 71 turnover cylinder; 72 bracket; 73 turnover frame; 8 residual film bale; 9 air intake system; 10 suspension system; 101 lift cylinder; 102 suspension connecting rod mechanism.

DETAILED DESCRIPTION OF THE EMBODIMENTS

The following clearly and completely describes the technical solutions in the embodiments of the present disclosure with reference to the drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the scope of protection of the present disclosure.

One of objectives of the present disclosure is to provide a self-propelled residual film recycling integrated machine, which can carry out the residual film recycling operation without a tractor for traction or suspension by equipping with a cab, a power system, a traveling system, a steering system and a braking system by itself, and can solve the problems that the existing traction type residual film recycling machine requires a tractor as power during operation, the operation efficiency is low, the stability is poor, the impurity content is high, and various technical indicators of residual film recycling are difficult to satisfy.

In order to make the objectives, features and advantages of the present disclosure more clearly, the present disclosure is further described in detail below with reference to the drawings and specific embodiments.

Embodiment 1

As shown in FIG. 1, a self-propelled residual film recycling integrated machine 100 is provided in this embodiment, including a straw crushing device 1, a picking and impurity cleaning device 3, a cab 4, an air intake system 9, a film removing and conveying device 5, a round bale baler 6, a suspension system 10, a traveling chassis 2 and a film unloading bracket 7. The straw crushing device 1 is assembled at a front end of the traveling chassis 2 in a three-point suspension mode. The picking and impurity cleaning device 3 is installed at the belly of the traveling chassis 2. The film removing and conveying device 5 is installed diagonally upwards and backwards of the picking and impurity cleaning device 3. The round bale baler 6 is installed at the tail of the traveling chassis 2 and behind the film removing and conveying device 5. The film unloading bracket 7 is installed below the round bale baler 6. The suspension system 10 is arranged on the traveling chassis 2 and is configured for hanging the picking and impurity cleaning device 3 and the film removing and conveying device 5. The traveling chassis 2 is equipped with a power system, a traveling system, a steering system and a braking system. The traveling chassis 2 preferably adopts a way that front wheels drive rear wheels to turn, so as to provide traveling power for the traveling chassis 2, such that the self-propelled residual film recycling integrated machine 100 can carry out the combined operation of plastic film recycling in season without a tractor for traction or suspension. Moreover, the residual film baling and recycling integrated technical route can achieve nine operations procedures, such as straw crushing and returning to the field, edge film lifting, soil dirt removal, wide-row film lifting, plastic film pickup, plastic film removing by a fan, residual film conveying, soil removing of residual film and residual film baling, at one time, thus achieving the integration of equipment intelligent self-driving, straw crushing and returning to the field and serialized residual film recycling procedures, and forming a set of high-performance self-propelled residual film recycling machine. The high-performance self-propelled residual film recycling machine has the advantages of high operation efficiency, strong stability and low impurity content, and can meet various technical indicators of residual film recycling, and solve the problems that the existing traction type residual film recycling machine requires a tractor as power during operation, the operation efficiency is low, the stability is poor, the impurity content is high, and various technical indicators of residual film recycling are difficult to satisfy.

Figure 2:
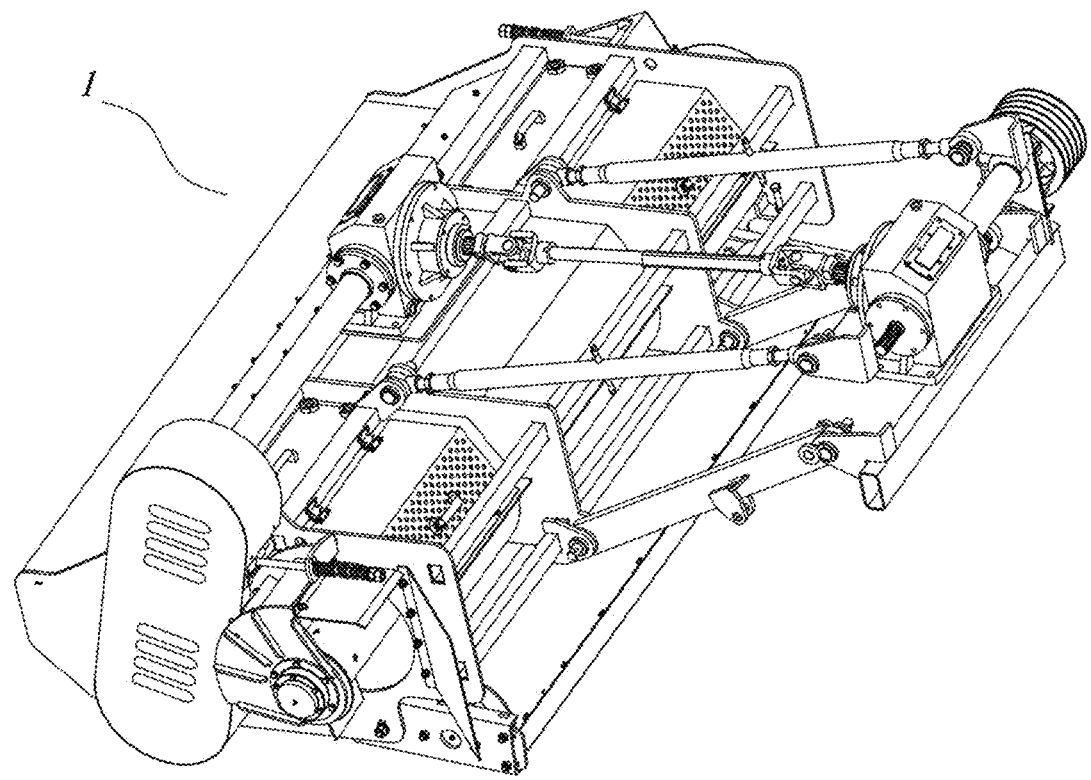
FIG. 2 is a structural diagram of a straw crushing device according to the embodiment of the present disclosure.
Figure 3:
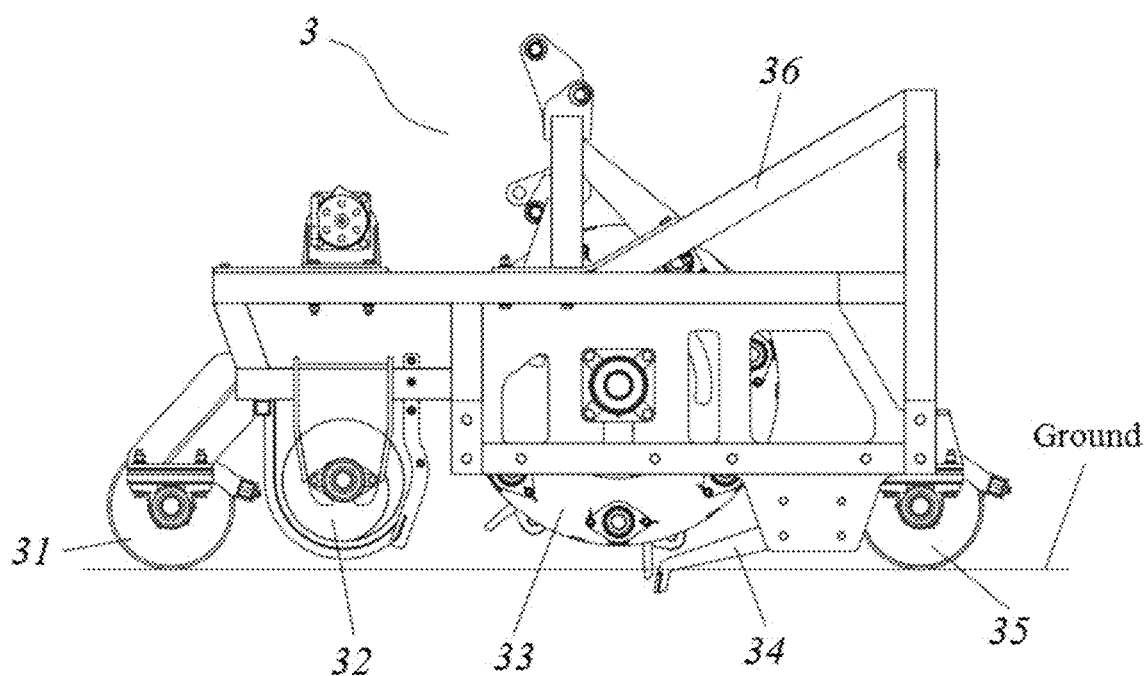
FIG. 3 is a side view of a picking and impurity cleaning device according to the embodiment of the present disclosure.
Figure 4:
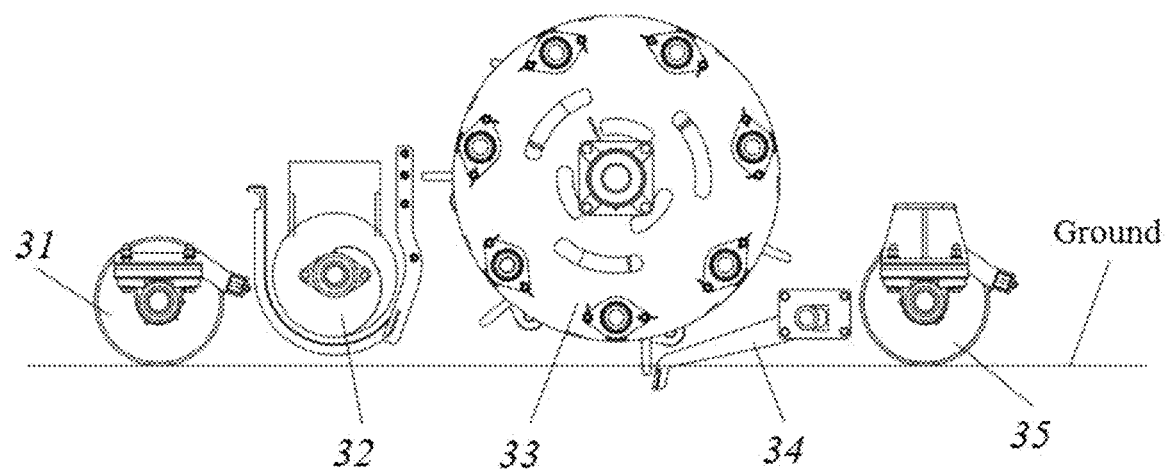
FIG. 4 is a side view of a relative position relationship among a front limiting roller and a rear limit roller, an impurity cleaning and conveying device, a film lifting shovel and a picking drum in the picking and impurity cleaning device according to the embodiment of the present disclosure.
Figure 5:
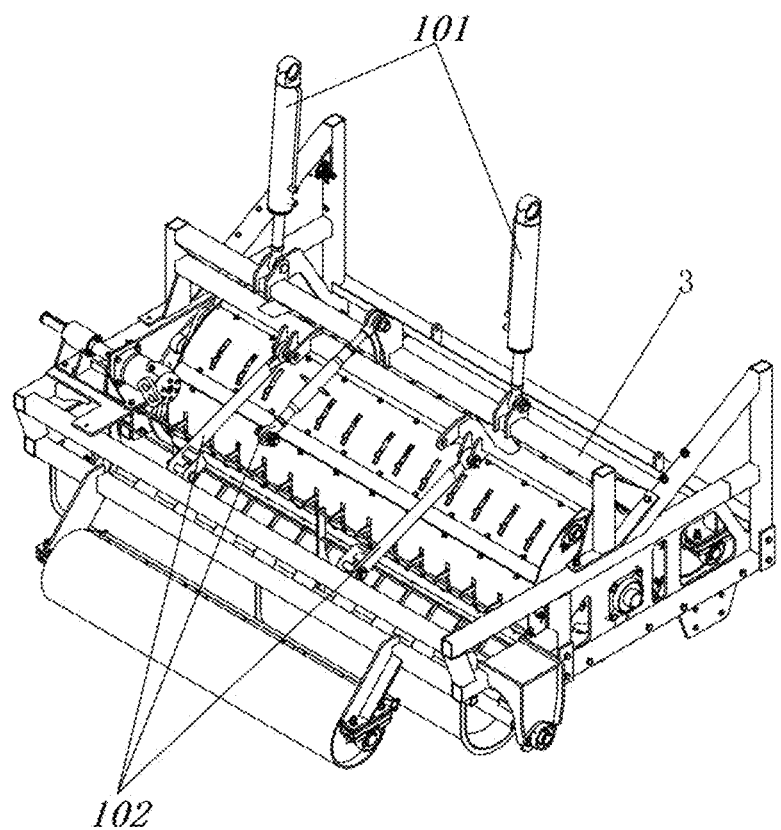
FIG. 5 is an isometric view of the assembly of the picking and impurity cleaning device and a suspension device according to the embodiment of the present disclosure.
Figure 6:
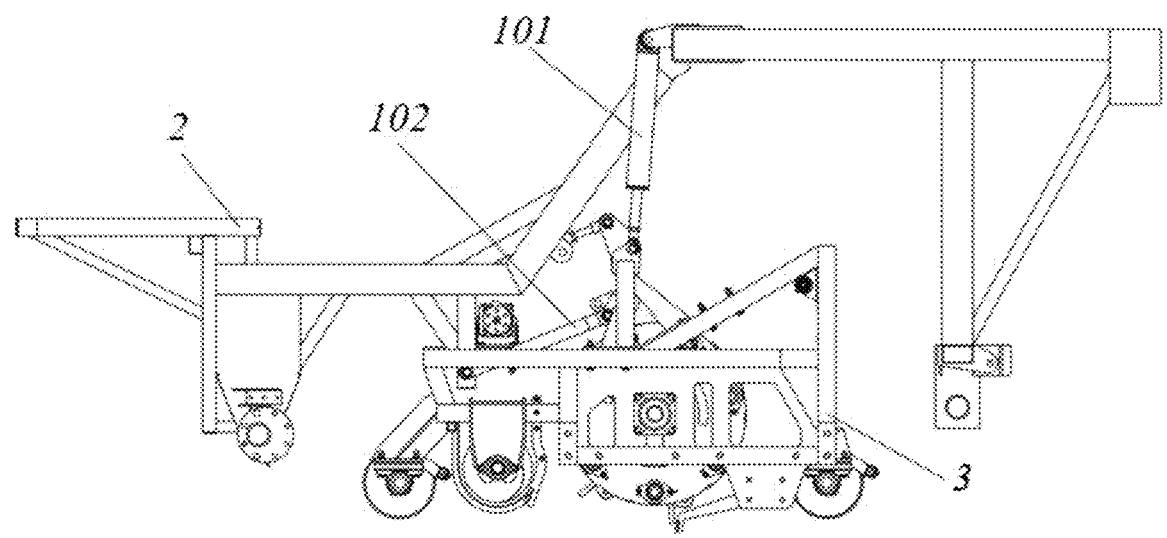
FIG. 6 is a side view of a picking and impurity cleaning device according to the embodiment of the present disclosure when the picking and impurity cleaning device is hung on a traveling chassis through the suspension system.
Figure 7:
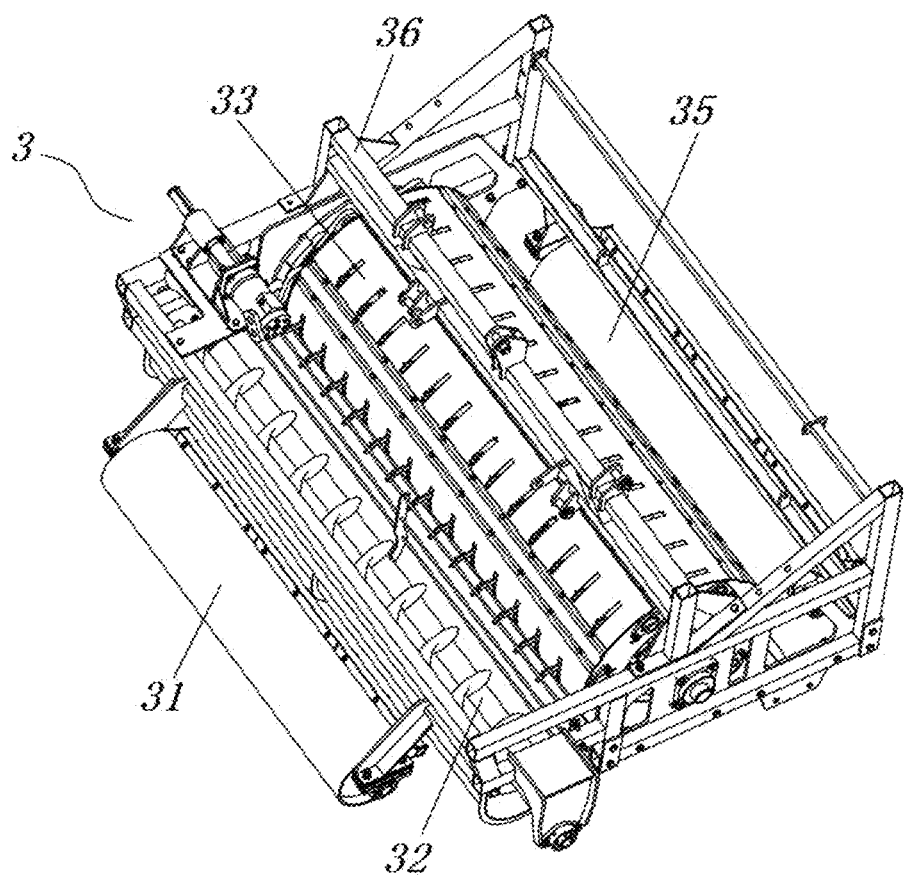
FIG. 7 is an isometric view of the picking and impurity cleaning device according to then embodiment of the present disclosure.

In this specific embodiment, as shown in FIG. 2, the straw crushing device 1 is preferably mounted at the front end of the traveling chassis 2 through front suspension in a three-point manner, and the power is transferred to the straw crushing device 1 by the traveling chassis 2 through front power output. When the straw crushing device 1, serving as the first procedure in the integrated operation technical route of the self-propelled residual film recycling integrated machine 100, operates, the straw standing on the earth surface is wound into the device for crushing, and then the crushed straw is discharged to one side of the machine by side discharge and returning to the field, so as to provide an excellent operation environment for the subsequent residual film recycling. The straw crushing device 1 is an existing mature machine, and thus will not be specifically described in detail here.

In this specific embodiment, as shown in FIG. 3 to FIG. 10, the picking and impurity cleaning device 3 includes a rack 36. A front limiting roller 31, an impurity cleaning and conveying device 32, a picking drum 33, a film lifting tooth assembly 34 and a rear limiting roller 25 are sequentially arranged on the rack 36 from front to back. The front limiting roller 31 and the rear limiting roller 35 have the same installation mode and are kept at the same horizontal height, so as to jointly limit the height of the film lifting tooth assembly 34 and the picking drum 33 from the ground. During the operation of the machine, the front limiting roller 31 and the rear limiting roller 35 are always in contact with the ground, thus limiting buried depths of the film lifting tooth assembly 34 and the picking drum 33. The film lifting tooth assembly 34 is installed diagonally downwards the picking drum 33, and tips of film lifting teeth 341 of the film lifting tooth assembly 34 are lower than horizontal bottom surfaces of the front limiting roller 31 and the rear limiting roller 35, and the film lifting teeth 341 on the film lifting tooth assembly 34 and picking teeth on the picking drum 33 are arranged in a mutual staggered manner. The film lifting teeth 341 enter the soil to lift the film to lift up the residual film on the surface and superficial layer of the soil. The picking teeth extending from the picking drum 33 lift the residual film, and meanwhile, the carried broken soil and other impurities enter a front impurity cleaning and conveying device 32, and the impurities are discharged to one side of the machine by an auger 321 with the continuous operation of the impurity cleaning and conveying device 32. The other residual film is transferred to a charge port of a film removing and conveying device 5 along with the pick-up drum 33 to enter the next residual film treatment link. In this embodiment, the pick-up drum 33 is the prior art, please referring to a double-roller slideway guide rail type residual film pick-up device disclosed in the invention patent No. CN116615976A for details.

Figure 8:
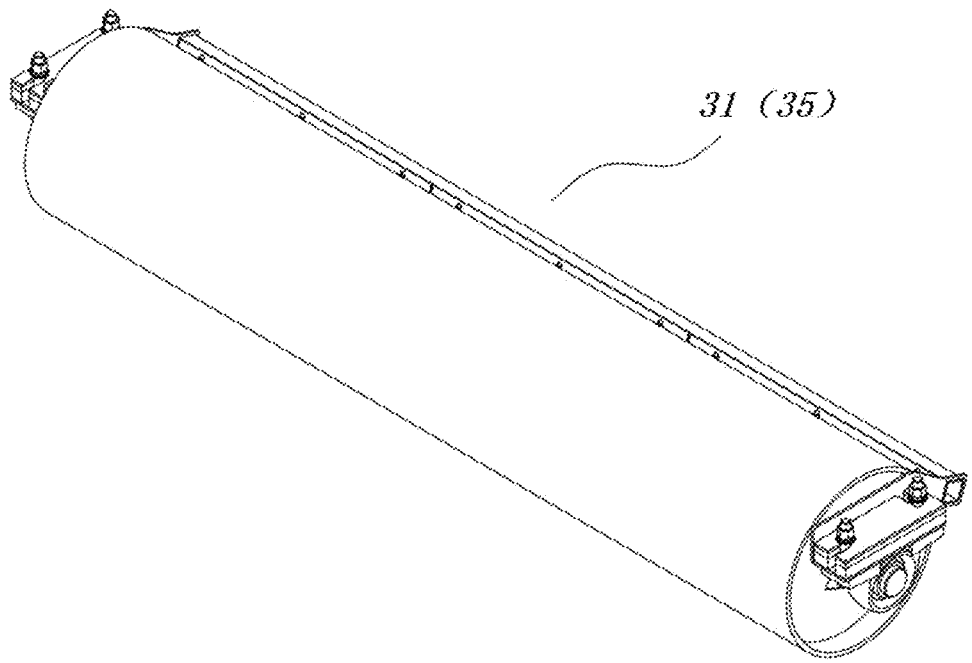
FIG. 8 is a structural diagram of the front limiting roller (or the rear limiting roller) in the picking and impurity cleaning device according to the embodiment of the present disclosure.

Further, the pick-up and impurity cleaning device 3 is mounted on the suspension system 10, and the suspension system 10 is mainly used for mounting and ascending/descending the pick-up and impurity cleaning device 3 and the film removing and conveying device 5. Specifically, the suspension system 10 includes a lift cylinder 101 and a suspension connecting rod mechanism 102. Two lift cylinders 101 are provided, top ends of the two lift cylinders 101 are both connected with a frame body on the traveling chassis 2, and bottom ends of the two lift cylinders 101 are both connected with the suspension connecting rod mechanism 102, and the rack 36 of the picking and impurity cleaning device 3 is connected with the suspension connecting rod mechanism 102. When the machine is in a non-operating state, the lift cylinders 101 may lift the picking and impurity cleaning device 3 upward to make the picking and impurity cleaning device 3 off the ground. When the machine is in an operating state, the lift cylinders 101 lower the picking and impurity cleaning device 3, and meanwhile, the suspension connecting rod mechanism 102 acts to make the front limiting roller 31 and the rear limiting roller 35 of the picking and impurity cleaning device achieve anywhere profiling. Generally, the front limiting roller 31 and the rear limiting roller 35 have the same structure, as shown in FIG. 8, both the front limiting roller 31 and the rear limiting roller 35 can be represented. "31(35)" in the figure means that a structure indicated by a lead can represent both the front limiting roller 31 and the rear limiting roller 35.

Further, in this embodiment, the impurity cleaning and conveying device 32 includes an auger 321 and a film blocking pole 322. The impurity cleaning and conveying device 32 is intended to clear away the impurities lifted by the picking drum 33, the film blocking pole 322 is assembled between the auger 321 and the picking drum 33, and is intended to prevent the residual film from entering the auger 321. The residual film is lifted by the picking and impurity cleaning device 3, and the thrown impurities are sent to the auger 321 at the same time. The impurities are conveyed to the outside of the machine by the auger 321, and the picking drum 33 picks up the residual film and conveys the residual film to the film removing and conveying device 5.

Figure 9:
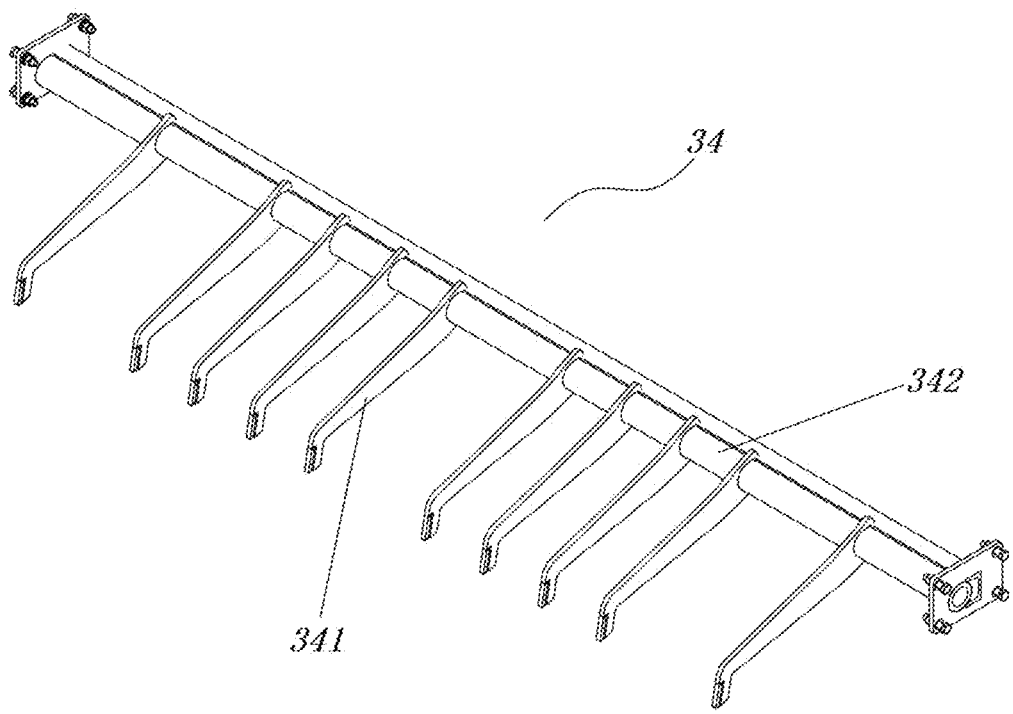
FIG. 9 is a structural diagram of a film lifting shovel in the picking and impurity cleaning device according to the embodiment of the present disclosure.
Figure 10:
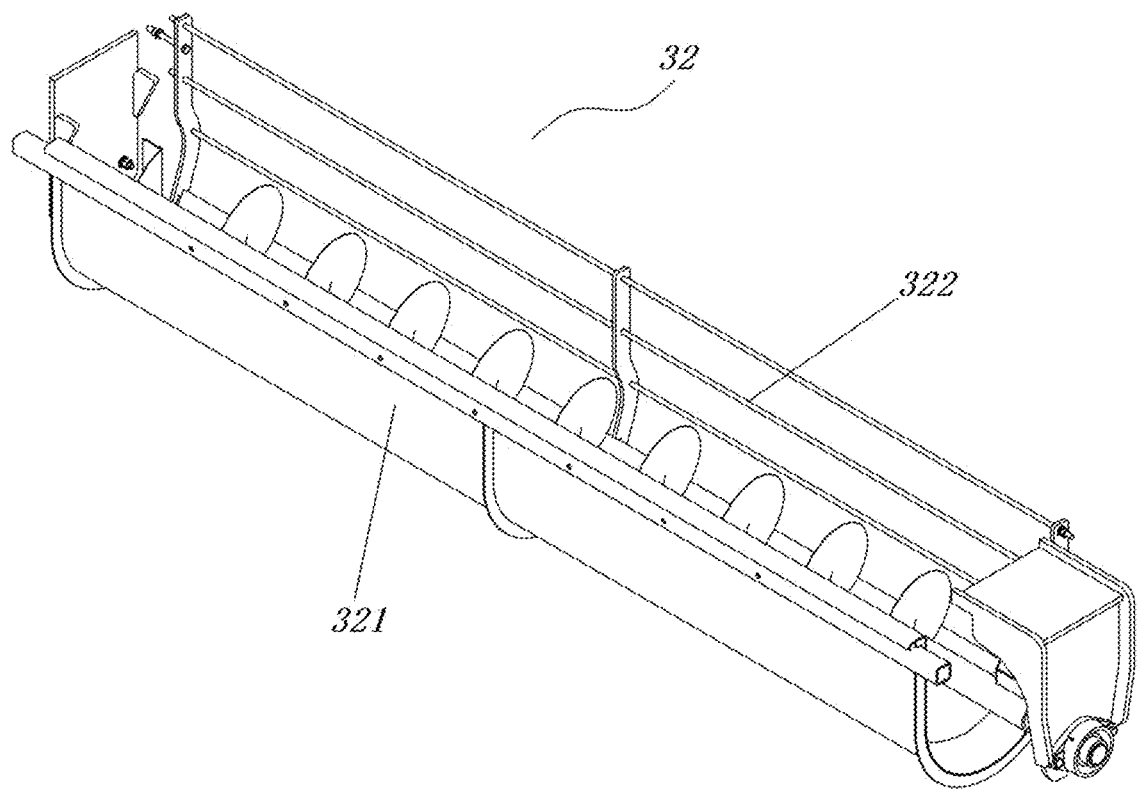
FIG. 10 is a structural diagram of an impurity cleaning and conveying device in the picking and impurity cleaning device according to the embodiment of the present disclosure.

Further, in this embodiment, the film lifting tooth assembly 34 includes film lifting teeth 341 and a film lifting pole 342. Multiple film lifting teeth 341 are transversely arranged and are fixedly connected with the film lifting pole 342, and the film lifting teeth 341 and nail teeth of the picking drum 33 are mutually alternated and arranged. Preferably, the film lifting teeth 341 on the film lifting tooth assembly 34 are arranged in the form of one wide row and three narrow rows alternated. The so-called "one wide row and three narrow rows" is as shown in FIG. 9. The multiple film lifting teeth 341 are arranged on the film lifting pole 342 at intervals, and intervals between any two adjacent film lifting teeth 341 are distributed according to the rules of one wide spacing, three consecutive narrow spacing, one wide spacing, three continuous narrow spacings, one wide spacing, and so on. Any two narrow spacings are the same, and any narrow spacing is less than the wide spacing. The film lifting teeth 341 are arranged in the formed of one wide row and three narrow rows, so as to lift the wide-row film. During the operation, the wide row (i.e., wide spacing) corresponds to a crop planting row, and the three narrow rows (i.e., three continuous narrow spacings) correspond to crop planting row spacings.

In this specific embodiment, as shown in FIG. 11 to FIG. 18, the film removing and conveying device 5 is installed obliquely above a rear side of the picking and impurity cleaning device 3, and plays the role of film removing and conveying and soil-film separation in the technical scheme of the residual film recycling operation. The film removing and conveying device 5 is integrally and is fixedly connected with the picking and impurity cleaning device 3, and can be adjusted for lifting and lowering along with the picking and impurity cleaning device 3 under the action of the suspension system 10. Specifically, the film removing and conveying device 5 includes a film removing fan 51, an exhaust hood 52 and a conveying and impurity cleaning device 53. A feed port of the film removing fan 51 is connected with the picking drum 33 of the picking and impurity cleaning device 3, a discharge port of the film removing fan 51 is connected with a vibration belt 532 of the conveying and impurity cleaning device 53, the exhaust hood 52 is installed above the vibration belt 532 and behind a discharge port of the film removing fan 51, and the exhaust hood 52 and the conveying and impurity cleaning device 53 jointly form a residual film conveying channel. After picking up the residual film by the picking drum 33 in the previous link, the residual film is transferred to the feed port of the film removing and conveying device 5, and the film removing fan 51 operates at a high speed to generate vacuum negative pressure to suck the residual film into a chamber of the film removing fan 51. With the operation of the film removing fan 51, the residual film is transferred to an air outlet of the film removing fan 51 and blown out by the wind, and enters the residual film conveying channel formed by the exhaust hood 52 and the conveying and impurity cleaning device 53. Air release holes are formed in the top surface and the side surface of the exhaust hood 52 to unload the wind force generated by the film removing fan 51, and the soil particles can be carried out of the machine when the wind force is unloaded. The conveying and impurity cleaning device 53 includes a vibration device 531, and a vibration belt 532 with meshes. In the residual film conveying process, the vibration device 531 below the vibration belt 532 continues to operate to beat a lower side of the vibration belt 532, making soil particles carried in the residual film fall back to the field through the meshes of the vibration belt 532. The cleaned residual film enters a chamber of the round bale baler 6 through the film removing and conveying device 5, so as to enter the next residual film treatment link.

Figure 11:
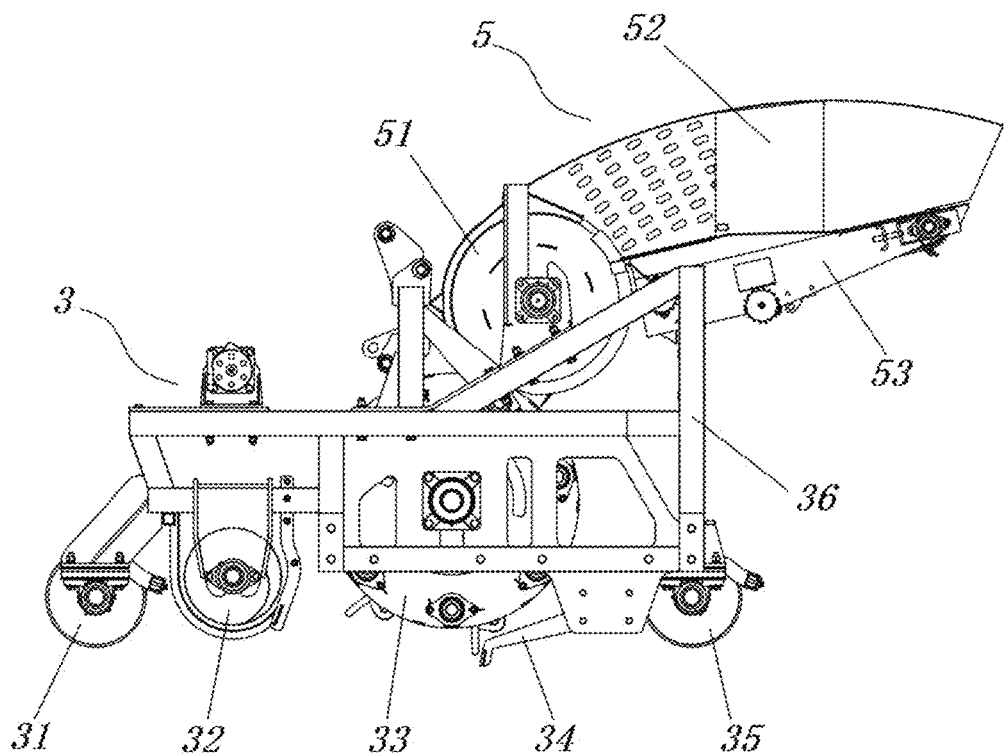
FIG. 11 is a side view of the assembly of the picking and impurity cleaning device and a film removing and conveying device according to the embodiment of the present disclosure.
Figure 12:
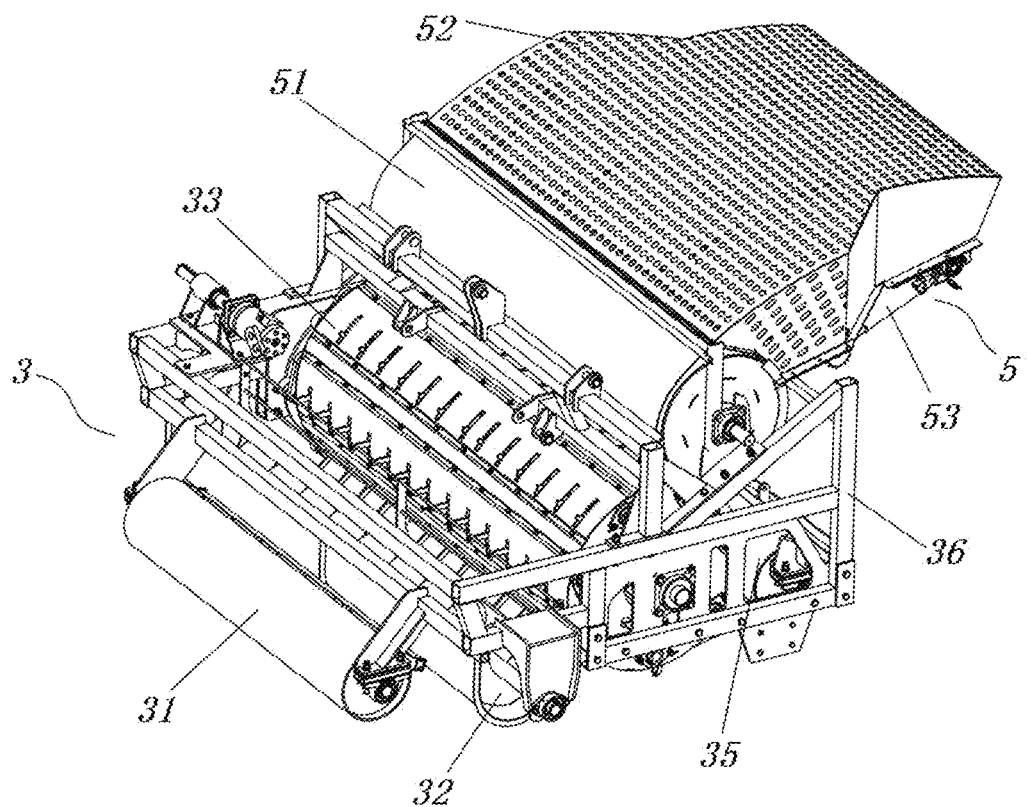
FIG. 12 is an isometric view of the assembly of the picking and impurity cleaning device and the film removing and conveying device according to the embodiment of the present disclosure.
Figure 13:
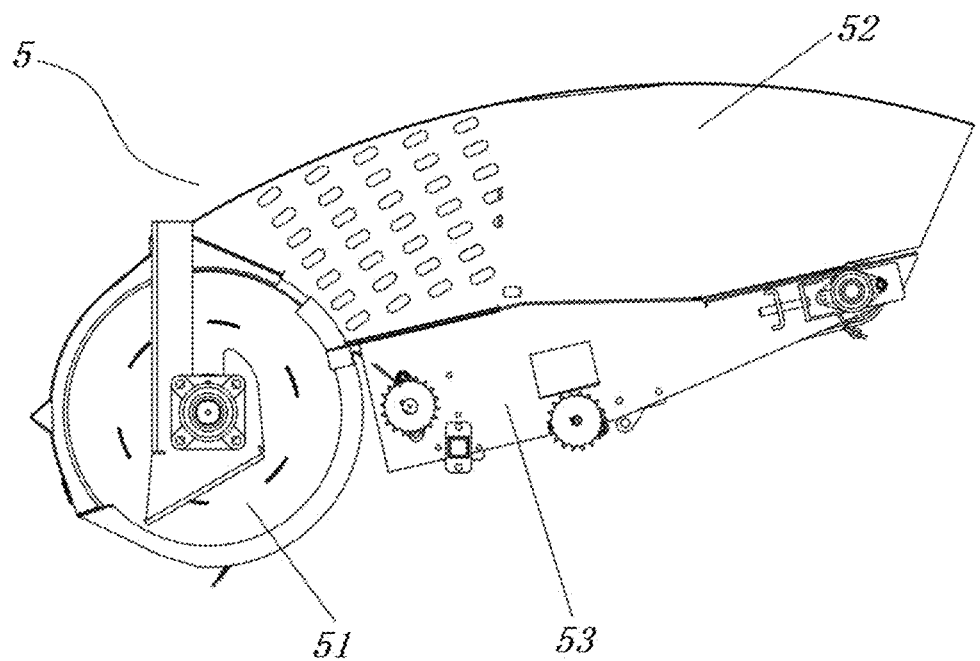
FIG. 13 is a side view of the film removing and conveying device according to the embodiment of the present disclosure.
Figure 14:
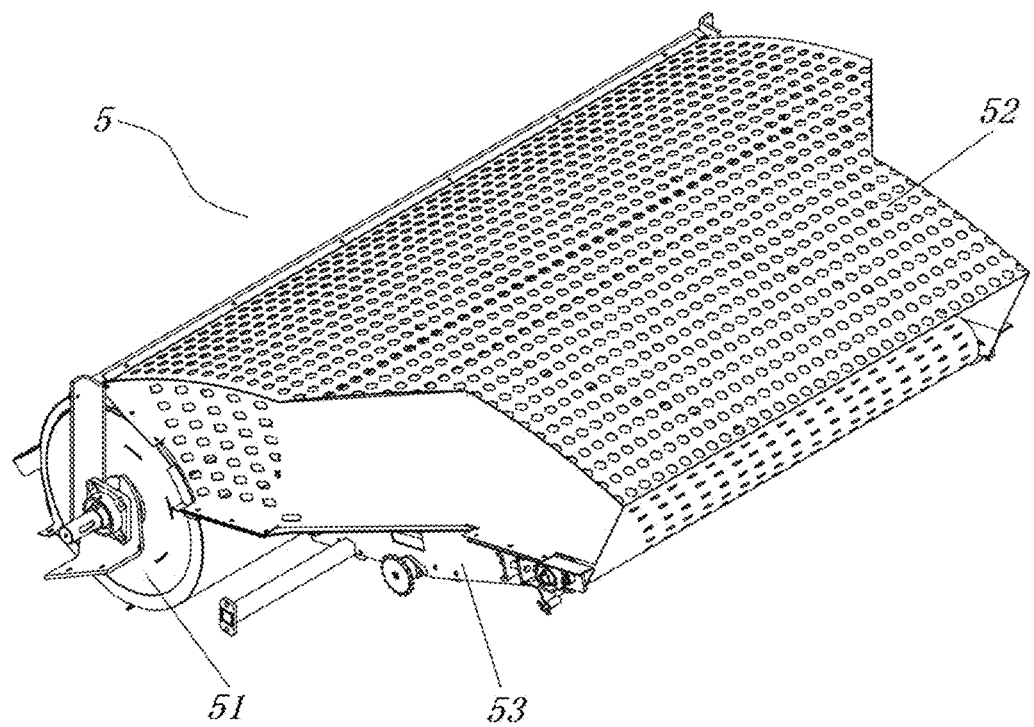
FIG. 14 is an isometric view of the film removing and conveying device according to the embodiment of the present disclosure.
Figure 15:
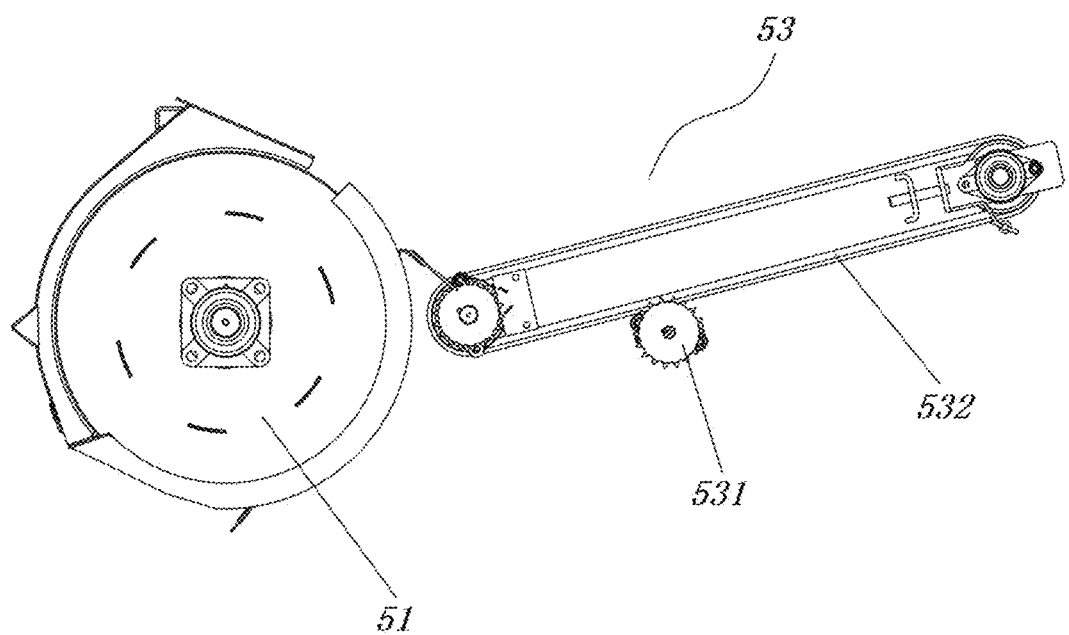
FIG. 15 is a side view of an assembly relationship of a film removing fan and a conveying and impurity cleaning device in the film removing and conveying device according to the embodiment of the present disclosure.
Figure 16:
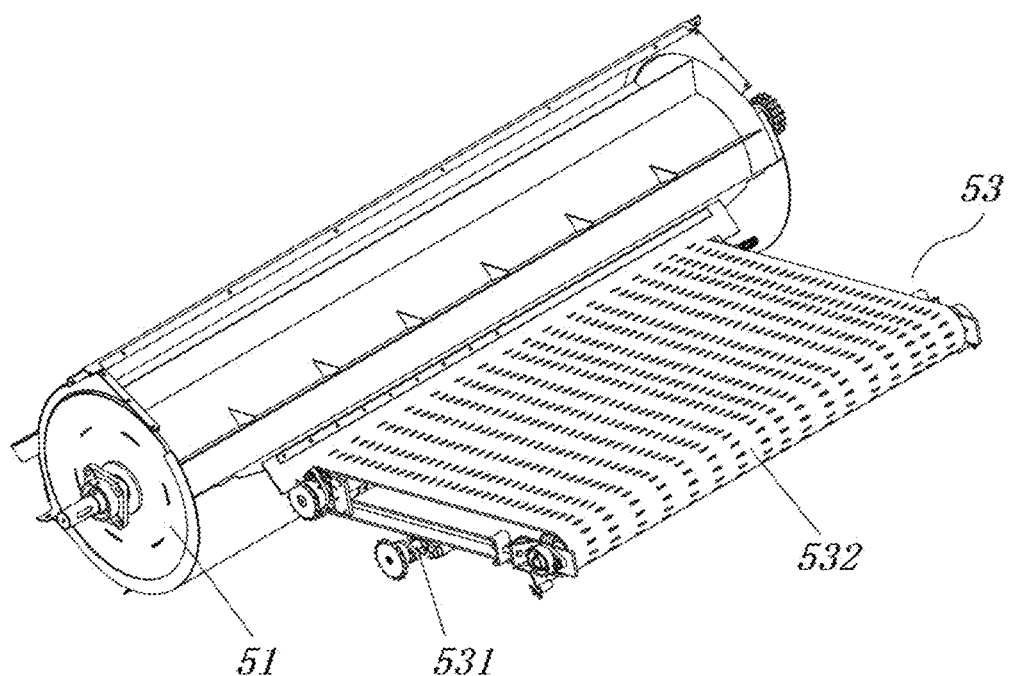
FIG. 16 is an isometric view of an assembly relationship of the film removing fan and the conveying and impurity cleaning device in the film removing and conveying device according to the embodiment of the present disclosure.
Figure 17:
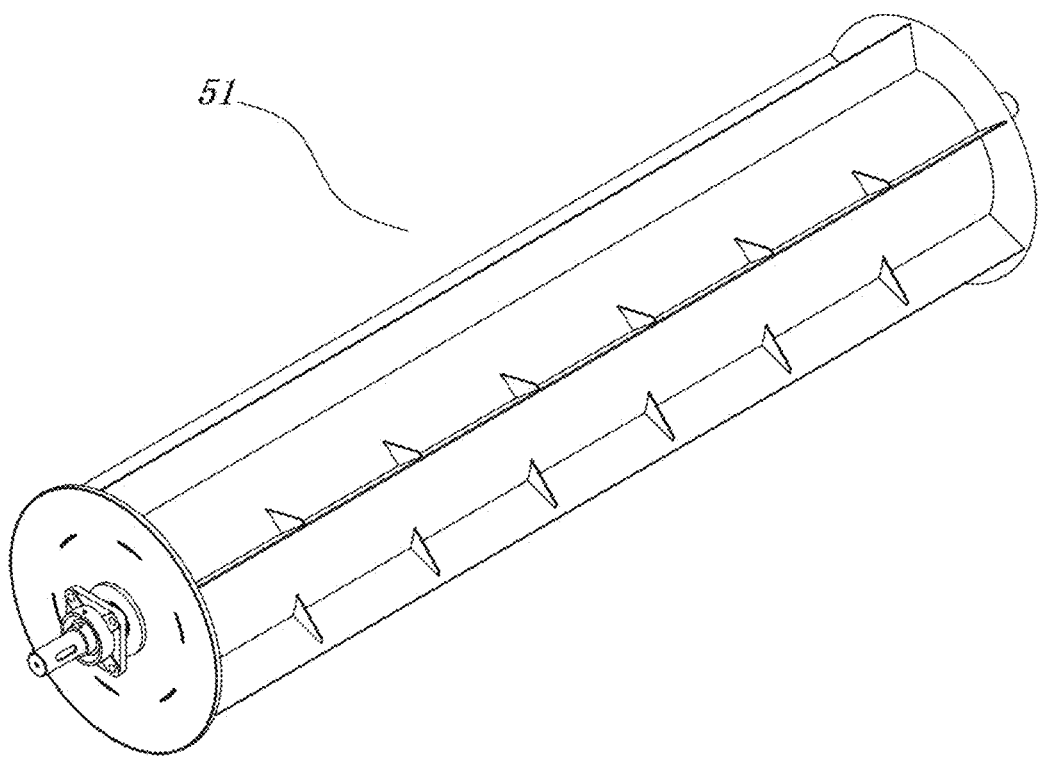
FIG. 17 is an isometric view of the film removing fan in the film removing and conveying device according to the embodiment of the present disclosure.
Figure 18:
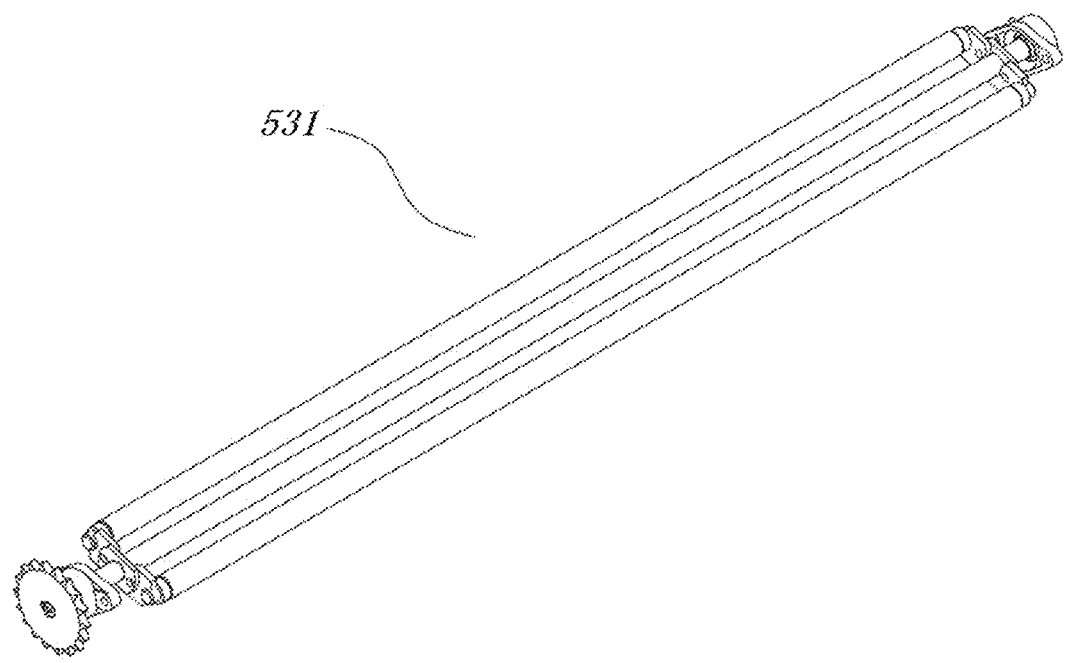
FIG. 18 is an isometric view of a vibration device in the film removing and conveying device according to the embodiment of the present disclosure.

Further, in this embodiment, as shown in FIG. 11, preferably, the picking drum 33 and the film removing fan 51 both rotate in a clockwise direction, and a rotating speed of the film removing fan 51 is greater than a rotating speed of the picking drum 33. When rotating to the feed port of the film removing fan 51 with the picking drum 33, the residual film can be wound into the fan to achieve film removing under high-speed rotation of the film removing fan 51.

Figure 19:
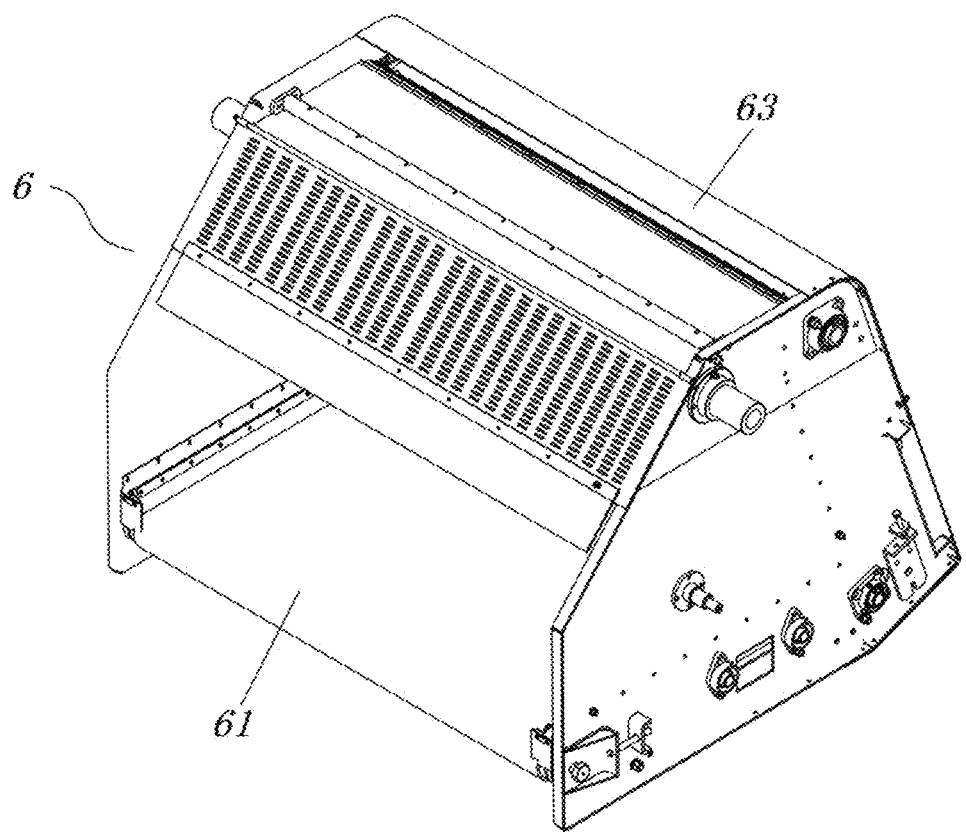
FIG. 19 is an isometric view of a round bale baler according to the embodiment of the present disclosure.
Figure 20:
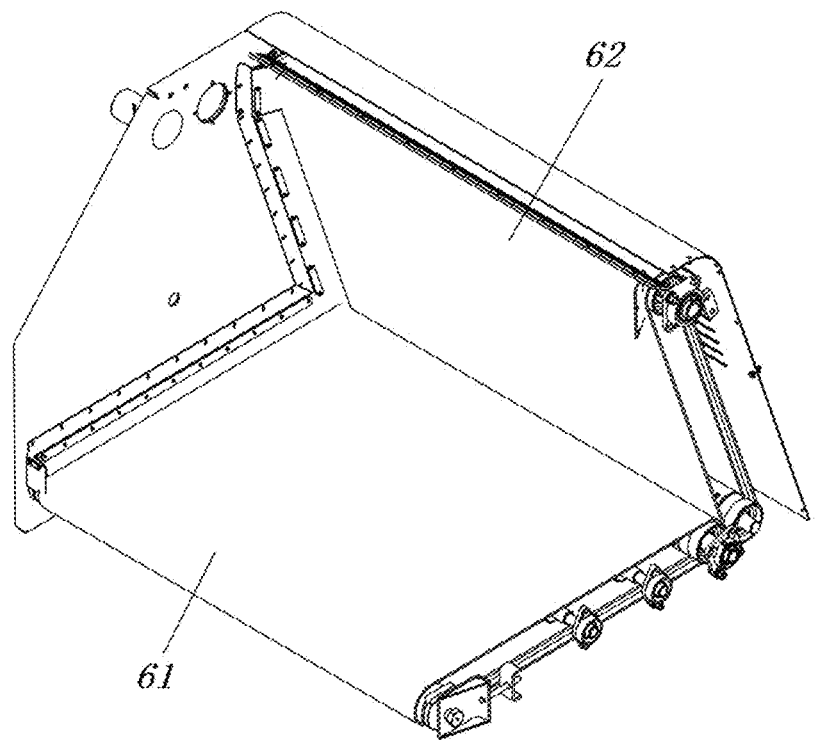
FIG. 20 is a diagram of an internal structure of a chamber in the round bale baler according to the embodiment of the present disclosure.
Figure 21:
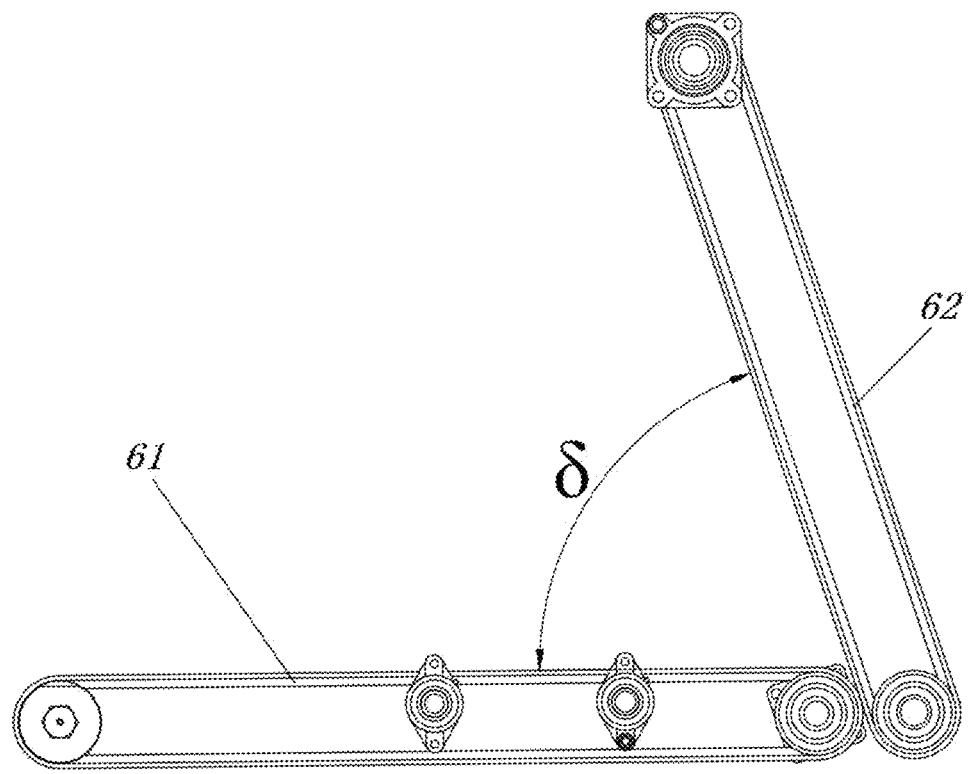
FIG. 21 is a schematic diagram of a relative installation relationship between a bottom belt and a back belt in the round bale baler according to the embodiment of the present disclosure.

In this specific embodiment, as shown in FIG. 19 to FIG. 21, the round bale baler 6 plays a role in baling the residual film into a bale. The round bale baler 6 is installed at the tail of the self-propelled residual film recycling integrated machine 100, including a bottom belt 61, a back belt 62 and a baling housing 63. The bottom belt 61 and the back belt 62 are arranged inside the baling housing 63, the bottom belt 61 and the back belt 62 are both conveyor belt structures, and the bottom belt 61 and the back belt 62 are installed in a V-shaped manner. As shown in FIG. 21, an included angle 8 between the bottom belt 61 and the back belt 62 is an acute angle, the bottom belt 61 and the back belt 62 rotate in a same direction, and an operating speed of the bottom belt 61 is less than an operating speed of the back belt 62. The residual film, after film removing and impurity cleaning by the stripping conveyor 5, falls onto the bottom belt 61 inside the chamber of the round bale baler 6, a friction force between the residual film and the bottom belt 61 is generated under the operation of the bottom belt 61, and the residual film is transferred to the surface of the back belt 62 along with the bottom belt 61 under the action of the friction force. Since the back belt 62 and the bottom belt 61 are installed at an acute angle 8, an installation height of a lower driving wheel of the back belt 62 is lower than an installation height of a right driving wheel of the bottom belt 61. As the operating speed of the back belt 62 is higher than the operating speed of the bottom belt 61, the residual film is driven by the back belt 62 to be continuously turned into a roll and rolled into a bale at the included angle between the bottom belt 61 and the back belt 62, and with the continuous operation of the self-propelled residual film recycling integrated machine 100, a cylindrical residual film bale 8 with a certain volume (characterized by a certain diameter) is finally generated in the chamber of the round bale baler 6.

Further, in this embodiment, preferably, a top end of the baling housing 63 of the round bale baler 6 is hinged with the frame body of the traveling chassis 2, unbaling cylinders are respectively arranged on the left side and the right side of the bottom end of the baling housing 63, one end of each unbaling cylinder is connected with the frame body of the traveling chassis 2, and the other end of the unbaling cylinder is connected with the bottom end of the baling housing 63. When the residual film on the bottom belt 61 of the round bale baler 6 is baled into a certain volume, the unbaling cylinder applies a pushing force onto the bottom end of the baling housing 63, making the whole round bale baler 6 composed of the baling housing 63, the bottom belt 61 and the back belt 62 overturned by a certain angle around the hinge axis on the top of the baling housing 63, and thus the residual film bale 8 can freely fall from the round bale baler 6.

Figure 22:
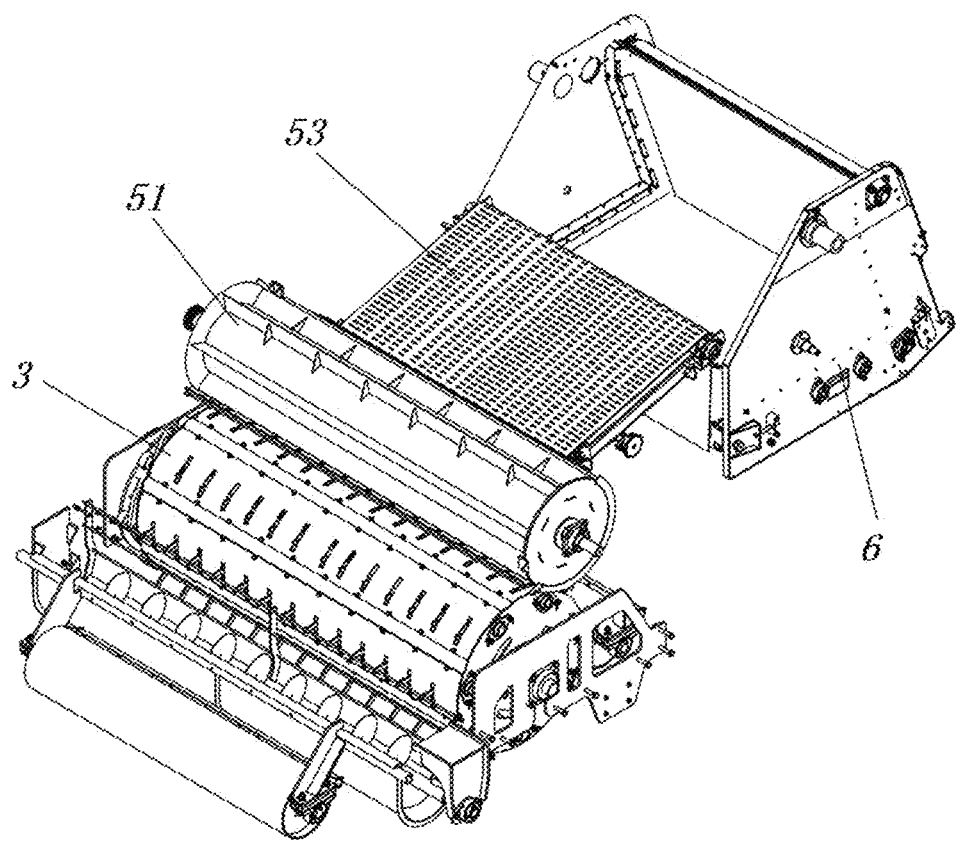
FIG. 22 is an isometric view of the assembly of the picking and impurity cleaning device, the film removing and conveying device and the round bale baler according to the embodiment of the present disclosure.
Figure 23:
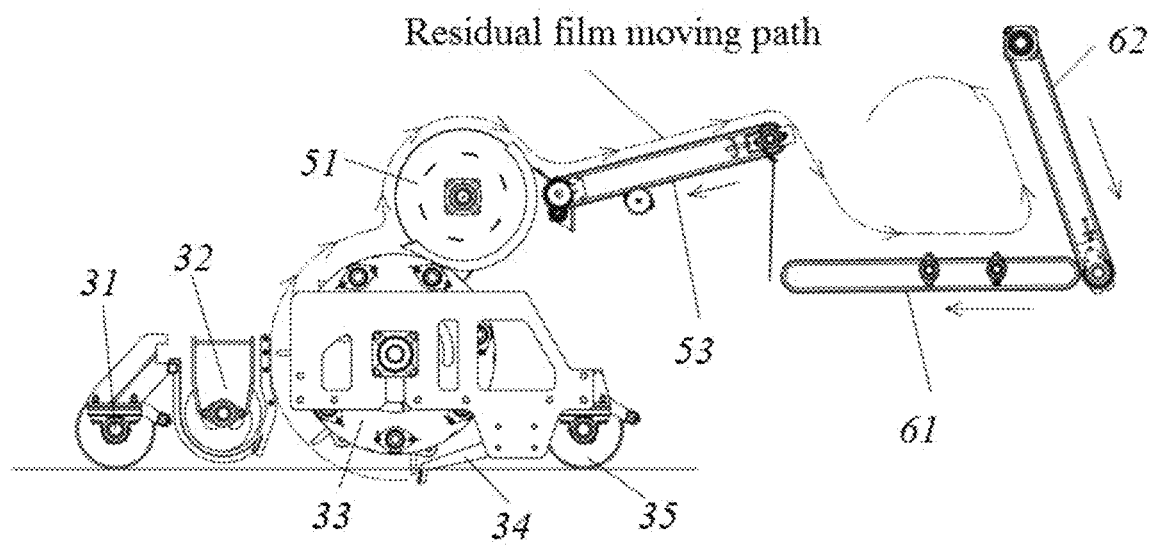
FIG. 23 is a schematic diagram of an integrated operation technical route including residual film lifting, picking up, impurity cleaning and conveying-baling according to the embodiment of the present disclosure.

In this specific embodiment, as shown in FIG. 22 and FIG. 23, a schematic diagram of a residual film picking and recycling integrated technical route of a self-propelled residual film recycling integrated machine 100 is provided, specifically including lifting the film by the film lifting tooth assembly 34, picking up the residual film by the picking drum 33, removing film by the film removing fan 51, impurity cleaning and conveying by the conveying and impurity cleaning device 53, and baling into a roll by the round bale baler 6. The self-propelled residual film recycling integrated machine 100 continuously operates to pick up the residual film, and finally a certain volume of a round residual film bale is formed in the chamber of the round bale baler 6. Then, the unbaling cylinders on both sides of the round bale baler 6 generate a pushing force to jointly push the round bale baler 6 to overturn for a certain angle, thus making the residual film bale 8 freely slide from the bottom belt 61 and fall onto the film unloading bracket 7 below.

Figure 24:
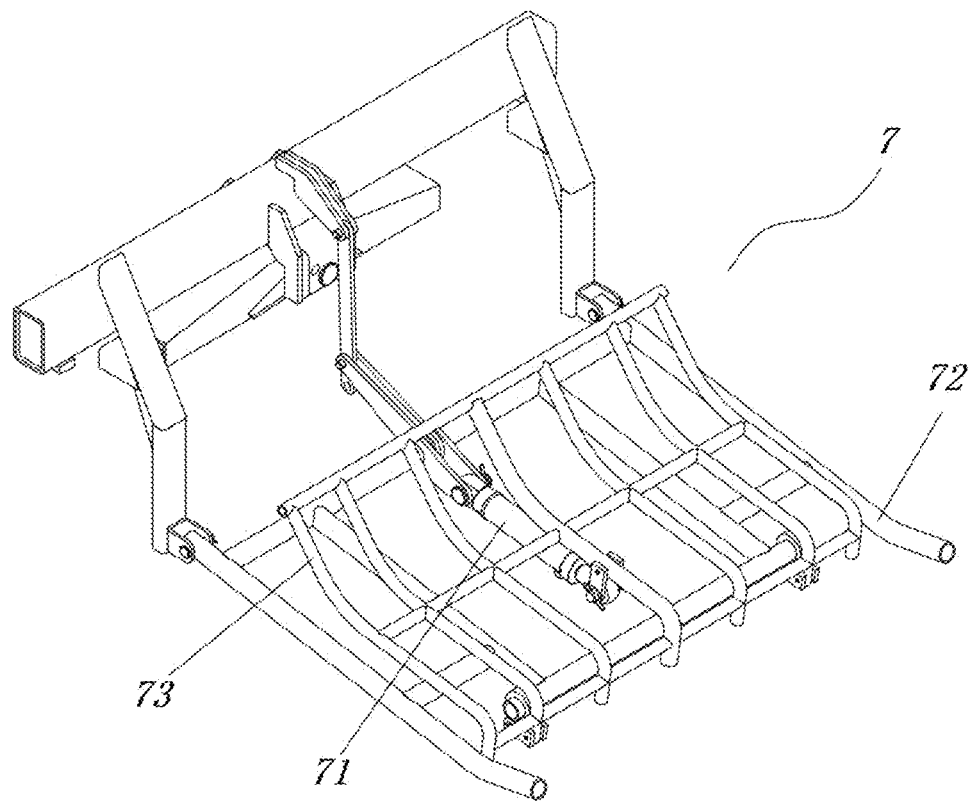
FIG. 24 is an isometric view of a film unloading bracket according to the embodiment of the present disclosure.
Figure 25:
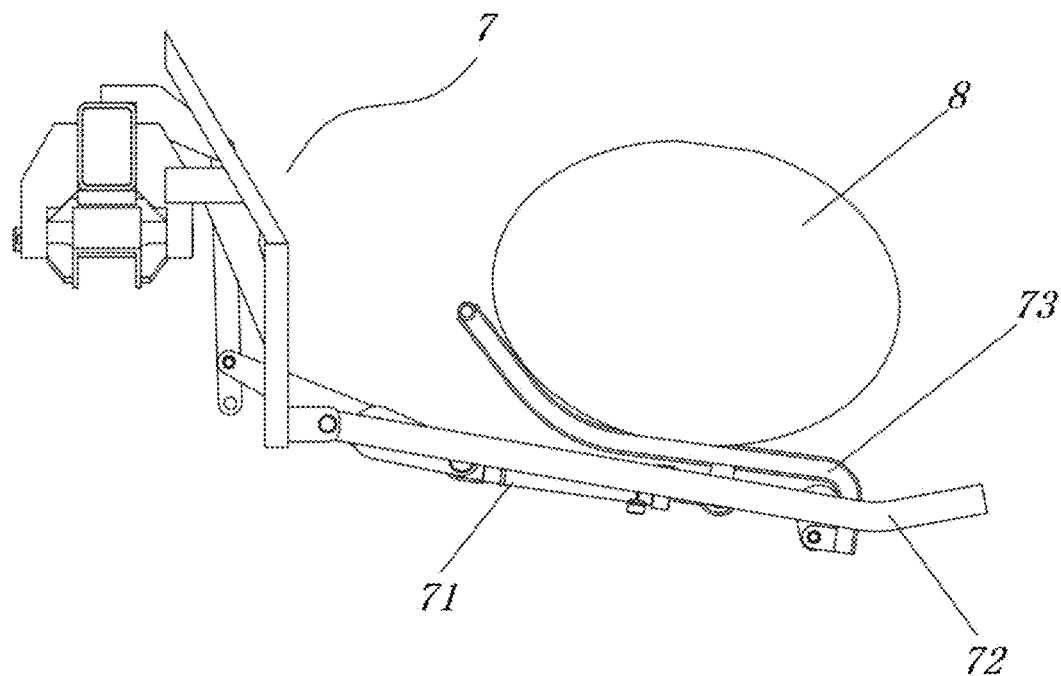
FIG. 25 is a side view of the assembly of the film unloading bracket and a residual film bale according to the embodiment of the present disclosure.
Figure 26:
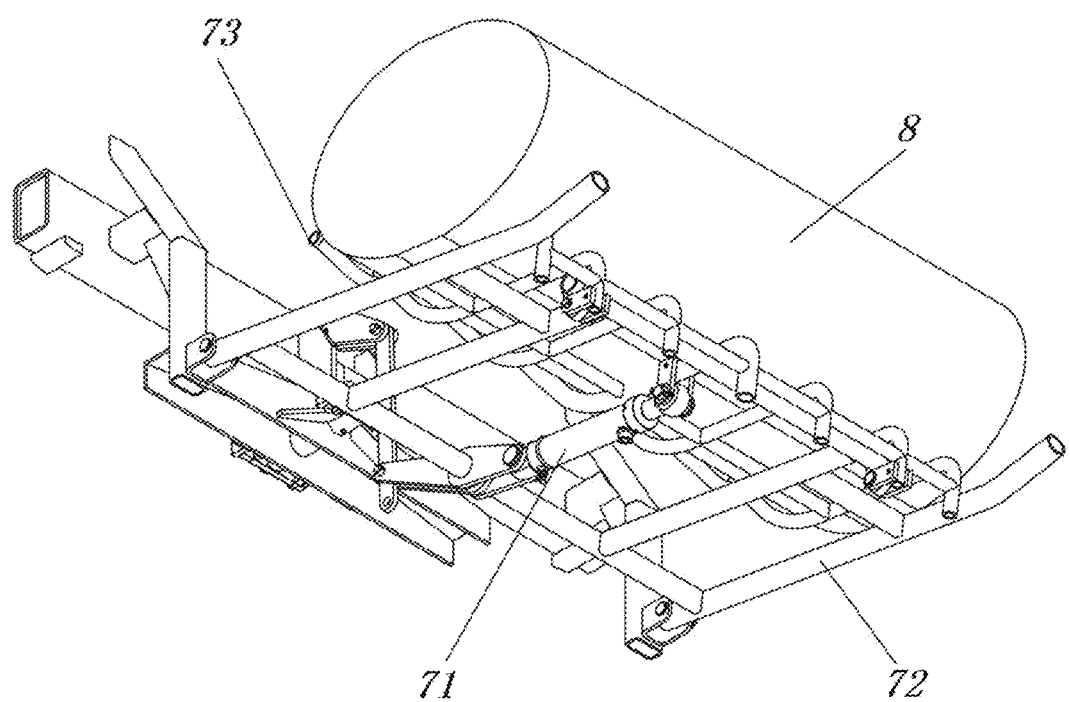
FIG. 26 is an isometric view of the assembly of the film unloading bracket and the residual film bale according to the embodiment of the present disclosure.

In this specific embodiment, as shown in FIG. 24 to FIG. 26, the film unloading bracket 7 is mounted below the round bale baler 6, which is configured to temporarily store the residual film bale 8 during field operation. Specifically, the film unloading bracket 7 includes a turnover cylinder 71, a bracket 72 and a turnover frame 73. The bracket 72 is arranged at a tail end of the traveling chassis 2, and the turnover frame 73 is arranged on the bracket 72. A tail end of the turnover frame 73 is hinged with the bracket 72, and the turnover cylinder 71 is connected between the tail end of the turnover frame 73 and the bracket 72. When a piston rod of the turnover cylinder 71 extends out, the turnover frame 73 can be pressed against the bracket 72, and at this time, the turnover frame 73 can normally support the residual film bale 8. When the piston rod of the turnover cylinder 71 retracts, the tail end of the turnover frame 73 is driven to turned downwards, which makes a head end of the turnover frame 73 turned upward and backward, and the whole turnover frame 73 is in a backward turnover state, making the residual film bale 8 thereon slide to the ground. During specific operation, after the residual film bale 8 is baled and falls onto the turnover frame 73, the machine carries the residual film bale 8 to continue the operation. When the machine moves to the field border, the turnover cylinder 71 acts on the turnover frame 73 to generate a pushing force, which makes the turnover frame turn backwards around the axis, and thus the residual film bale 8 can land stably, and the residual film recycling operation can be achieved without stopping for film unloading.

In this specific embodiment, as shown in FIG. 1, when the self-propelled residual film recycling integrated machine 100 operates, a large amount of dust is generated under the continuous operation of the straw crushing device 1, the picking and impurity cleaning device 3 and the film removing and conveying device 5. Based on this, in this embodiment, an air intake system 9 is arranged above the cab 4. The air intake system 9 includes a ventilation duct, an air inlet of the ventilation duct is arranged at a front upper of the cab 4, and an air outlet of the ventilation duct communicates with an air inlet of an engine on the traveling chassis 2. The air inlet of the ventilation duct is arranged at the front upper of the cab 4, which can avoid dust generation areas of the straw crushing device 1, the picking and impurity cleaning device 3 and the film removing and conveying device 5, provide clean air for the engine, and prevent the dust from entering the engine. In order to improve the cleaning effect, a filtering device and other structures may also be installed on the ventilation duct to effectively clean and filter the air entering the engine.

In this specific embodiment, the self-propelled residual film recycling integrated machine 100 is further equipped with an auxiliary driving system based on Beidou navigation, which can achieve the switching between unmanned driving and human-machine combined driving. In the operation process through the Beidou navigation function.

In this specific embodiment, the self-propelled residual film recycling integrated machine 100 is further equipped with an operation quality monitoring system, which can achieve the functions of recording a traveling track in the operation process and recording and storing the video of earth surface operation quality, is configured to calculate the workload of residual film recycling and check the operation quality of residual film recycling, and thus is of great practical significance to the field of residual film recycling.

When the self-propelled residual film recycling integrated machine 100 proposed in this technical solution is in operation, after the straw crushing device 1 arranged at the front discharges the crushed straw into the field, the film is lifted by the picking and impurity cleaning device through the film lifting tooth assembly 34, the residual film is picked up by the picking drum 33, and the impurity cleaning and conveying device 32 discharges impurities at the side. The picked-up residual film is further subjected to soil dirt cleaning by the film removing and conveying device 5, and then is conveyed into the round bale baler 6 to be baled into a roll, and the residual film bale is unloaded to fall into film unloading bracket 7. When the machine moves to the field border, the turnover frame 73 is overturned to make the residual film bale land smoothly, such that the recycled residual film bale is concentrated on the field border, and the operation intensity of picking up and collecting the residual film bale is reduced. The self-propelled residual film recycling integrated machine 100 can achieve nine operations procedures, such as straw crushing and returning to the field, edge film lifting, soil dirt removal, wide-row film lifting, plastic film pickup, plastic film removing by a fan, residual film conveying, soil removing of residual film and residual film baling, at one time, with high automation degree, high operation efficiency and good residual film recycling effect. The serialized mechanical plastic film recycling scheme provides a design reference for the residual film recycling field. Compared with the prior art, the technical solution has beneficial effects as follows.

(1) The self-propelled residual film recycling integrated machine 100 provided by the present disclosure is equipped with the cab, the power system, the transmission system, the traveling system, the steering system and the braking system by itself, and can achieve the combined operation of residual film recycling in season without a tractor for traction or suspension, has a self-contained power output system, and combines the process of straw crushing and returning to the field with the serialized residual film recycling, and a series of operations with multiple processes in one machine is achieved.

(2) The self-propelled residual film recycling integrated machine 100 provided by the invention is further equipped with the auxiliary driving system and the operation quality monitoring system based on Beidou navigation, which can integrated independent units, such as straw crushing and returning to the field, self-propelled traveling system, autonomous navigation function, serialized residual film recycling and mechanical-hydraulic transmission system, into one machine, achieve the switching between two driving modes of unmanned driving and man-machine combined driving, and achieve the recording of a traveling track in the operation process and the recording and storage of the video of the earth surface operation quality, and thus have important practical significance for the field of residual film recycling.

(3) According to the self-propelled residual film recycling integrated machine 100 provided by the present disclosure, the air intake system is provided on the cab, and the air inlet of the air intake system is arranged at the front upper part of the cab, such that the machine can always provide clean air for the engine in a harsh environment and effectively prevent dust from entering the engine, thus improving the stability of the machine.

(4) According to the self-propelled residual film recycling integrated machine 100 provided by the present disclosure, the picking and impurity cleaning device includes a picking drum, a front limiting roller and a rear limiting roller, an impurity cleaning and conveying device, a film lifting tooth assembly and other structures. The film lifting tooth assembly is provided with film lifting teeth, and the film lifting teeth are alternated with picking teeth on the picking drum, thus guaranteeing the continuity of film lifting and film picking, and improving the film picking efficiency. The impurity cleaning and conveying device is provided with a film blocking pole, which can prevent the residual film from entering the impurity cleaning and conveying device when the picking drum picks up the residual film, and promote the separation of impurities from the residual film. Grounding limiting rollers are installed in front of or at the rear of the picking and impurity cleaning device, and the front and rear limiting rollers are installed at the same horizontal height to limit the buried depth of the film lifting tooth assembly and the picking teeth.

(5) According to the self-propelled residual film recycling integrated machine 100 provided by the present disclosure, the pickup and impurity cleaning device is mounted on the suspension system, and when the machine does not operate or turns around at the field border, the lift cylinder on the suspension system can lift the picking and impurity cleaning device upwards to make the picking and impurity cleaning device leave the ground. When the machine operates, the lift cylinder on the suspension system will descend the picking and impurity cleaning device, and meanwhile, a suspension connecting rod mechanism of the suspension system can achieve anywhere profiling of the picking and impurity cleaning device, making the front limiting roller and the rear limiting roller of the picking and impurity cleaning device always attached to the ground.

(6) According to the self-propelled residual film recycling integrated machine 100 provided by the present disclosure, the feed port of the film removing fan of the film removing and conveying device is closely connected with the picking drum, and the residual film picked up by the picking drum can smoothly enter the fan through the inlet to achieve film removing. Wind force is generated under the high-speed operation of the film removing fan, and the residual film is blown to the residual film channel formed by the conveying and impurity cleaning device and the exhaust hood. Air release holes are formed in the top surface and the side surface of the exhaust hood for unloading the wind force. The conveying and impurity cleaning device includes a vibration device, and a vibration belt with meshes. Under the cooperative operation of the vibration device and the vibration belt, the soil is separated from the film, and the soil is effectively discharged from the machine by means of different shapes and densities of the residual film and the soil.

(7) According to the self-propelled residual film recycling integrated machine 100 provided by the present disclosure, an inlet of the round bale baler is connected with the tail of the film removing and conveying device, and the residual film, after being subjected to film removing and impurity cleaning through the film removing and conveying device, falls into the chamber of the round bale baler. The chamber of the round bale baler is internally provided with the bottom belt and the back belt, and the operating speed of the bottom belt is less than the operating speed of the back belt, and the bottom belt and the back belt are assembled in a V-shaped acute angle form. The residual film can be turned into a roll under the joint operation of the bottom belt and the back belt, thus achieve round baling. Such an innovative design has a simple structure, avoids film leakage during baling, and improves the baling stability.

(8) According to the self-propelled residual film recycling integrated machine 100 provided by the present disclosure, the film unloading bracket is placed below the round bale baler. When the residual film in the round bale baler reaches a certain volume, hydraulic cylinders located at both sides of the round bale baler exert the pushing force to make the round bale baler overturn, making the baled residual film bale freely fall into the film unloading bracket. When the machine moves to the field border, the turnover cylinder on the film unloading bracket exerts the pushing force on the turnover frame to make the turnover frame overturn backwards, such that the residual film bale can land stably, and residual film recycling operation can be achieved without stopping for film unloading.

The above is only the preferred embodiment of the present disclosure, and is not used to limit the present disclosure. Any modification, equivalent substitution, improvement, etc. made within the spirit and principle of the present disclosure should be included in the scope of protection of the present disclosure.

What is claimed is:

1. A self-propelled residual film recycling integrated machine, comprising:
   a traveling chassis, wherein a power system, a traveling system, a steering system and a braking system are equipped on the traveling chassis;
   a cab, wherein the cab is arranged on the traveling chassis;
   a straw crushing device, wherein the straw crushing device is arranged at a front end of the traveling chassis, and is configured to crush straw and discharges crushed straw back to field on one side of the machine;
   a picking and impurity cleaning device, wherein the picking and impurity cleaning device is arranged at a belly of the traveling chassis, and is configured to lift a film, pick up a residual film and clearing away impurities generated when the film is picked up;
   a film removing and conveying device, wherein the film removing and conveying device is arranged diagonally upwards and backwards of the picking and impurity cleaning device, and is configured to receive the residual film picked up by the picking and impurity cleaning device, and to clear away soil dirt on the residual film;
   a round bale baler, wherein the round bale baler is arranged at a tail of the traveling chassis, and is configured to receive the residual film after the soil dirt is removed by the film removing and conveying device, and to bale the residual film into a roll to form a residual film bale; and
   a suspension system, wherein the suspension system comprises a suspension connecting rod mechanism and lift cylinders; one end of each of the lift cylinders is connected with a frame body of the traveling chassis, and an other end of each of the lift cylinders is connected with the suspension connecting rod mechanism; the picking and impurity cleaning device is connected with the suspension connecting rod mechanism; the lift cylinders are configured to control the picking and impurity cleaning device to lift and lower, and the suspension connecting rod mechanism is configured for achieving anywhere profiling of the picking and impurity cleaning device.

2. The self-propelled residual film recycling integrated machine according to claim 1, wherein the straw crushing device is assembled at the front end of the traveling chassis in a three-point suspension mode.

3. The self-propelled residual film recycling integrated machine according to claim 2, wherein the picking and impurity cleaning device comprises a rack,
wherein an impurity cleaning and conveying device, a picking drum and a film lifting tooth assembly are sequentially arranged on the rack from front to back,
wherein the film lifting tooth assembly is located diagonally downwards the picking drum and comprises a film lifting pole and a plurality of film lifting teeth arranged on the film lifting pole,
wherein the plurality of film lifting teeth and picking teeth on the picking drum are arranged in a mutual staggered manner,
wherein the plurality of film lifting teeth are configured for penetrating the soil and lifting the residual film,
wherein the picking teeth extending from the picking drum are configured for further lifting the residual film that has been lifted by the plurality of film lifting teeth and conveying the residual film to the film removing and conveying device,
wherein the impurity cleaning and conveying device comprises an auger and a film blocking pole, wherein the film blocking pole is assembled between the auger and the picking drum and is configured for preventing the residual film from entering the auger, and
wherein the auger is configured to convey impurities discharged when the residual film is picked up to one side of the machine.

4. The self-propelled residual film recycling integrated machine according to claim 2, wherein the round bale baler comprises a bottom belt, a back belt and a baling housing,
wherein the baling housing is connected with a frame body of the traveling chassis,
wherein both the bottom belt and the back belt are arranged in the baling housing,
wherein the bottom belt and the back belt are arranged at an acute angle,
wherein the bottom belt is attached to a discharge port of the film removing and conveying device,
wherein an operating speed of the back belt is greater than an operating speed of the bottom belt, and
wherein the back belt is configured for turning the residual film on the bottom belt into a roll to form the residual film bale.

5. The self-propelled residual film recycling integrated machine according to claim 1, wherein the film removing and conveying device is entirely fixedly connected with the picking and impurity cleaning device, and the film removing and conveying device is able to be lifted and lowered under drive of the lift cylinders.

6. The self-propelled residual film recycling integrated machine according to claim 5, wherein the picking and impurity cleaning device comprises a rack, and
wherein an impurity cleaning and conveying device, a picking drum, and a film lifting tooth assembly are sequentially arranged on the rack from front to back,
wherein the film lifting tooth assembly is located diagonally downwards the picking drum, and comprises a film lifting pole and a plurality of film lifting teeth arranged on the film lifting pole,
wherein the plurality of film lifting teeth and picking teeth on the picking drum are arranged in a mutual staggered manner,
wherein the plurality of film lifting teeth are configured for penetrating the soil and lifting the residual film,
wherein the picking teeth extending from the picking drum are configured for further lifting the residual film that has been lifted by the plurality of film lifting teeth and conveying the residual film to the film removing and conveying device,
wherein the impurity cleaning and conveying device comprises an auger and a film blocking pole,
wherein the film blocking pole is assembled between the auger and the picking drum and is configured for preventing the residual film from entering the auger, and
wherein the auger is configured to convey impurities discharged when the residual film is picked up to one side of the machine.

7. The self-propelled residual film recycling integrated machine according to claim 1, wherein the picking and impurity cleaning device comprises a rack, and an impurity cleaning and conveying device, a picking drum and a film lifting tooth assembly are sequentially arranged on the rack from front to back;
the film lifting tooth assembly is located diagonally downwards the picking drum, and comprises a film lifting pole and a plurality of film lifting teeth arranged on the film lifting pole, the plurality of film lifting teeth and picking teeth on the picking drum are arranged in a mutual staggered manner, and the plurality of film lifting teeth are configured for penetrating the soil and lifting the residual film, and the picking teeth extending from the picking drum are configured for further lifting the residual film that has been lifted by the plurality of film lifting teeth and conveying the residual film to the film removing and conveying device;
the impurity cleaning and conveying device comprises an auger and a film blocking pole, wherein the film blocking pole is assembled between the auger and the picking drum and is configured for preventing the residual film from entering the auger, and the auger is configured to convey impurities discharged when the residual film is lifted to one side of the machine.

8. The self-propelled residual film recycling integrated machine according to claim 7, wherein the picking and impurity cleaning device further comprises a front limiting roller, and a rear limiting roller; the front limiting roller and the rear limiting roller are arranged on the rack at an equal height, the front limiting roller is located in front of the impurity cleaning and conveying device, the rear limiting roller is located behind the film lifting tooth assembly, and the front limiting roller and the rear limiting roller are configured to limit a buried depth of the film lifting tooth assembly and a buried depth of the picking teeth, respectively.

9. The self-propelled residual film recycling integrated machine according to claim 7, wherein the plurality of film lifting teeth are arranged on the film lifting pole in a form of one wide row and three narrow rows alternated, the wide row is matched with a crop planting row, and the three narrow rows are matched with crop planting row spacings.

10. The self-propelled residual film recycling integrated machine according to claim 7, wherein the film removing and conveying device comprises a film removing fan, an exhaust hood and a conveying and impurity cleaning device, a feed port of the film removing fan is attached to a discharge port of the picking and impurity cleaning device;

the conveying and impurity cleaning device comprises a vibration belt with meshes and a vibration device arranged below the vibration belt; a discharge port of the film removing fan is connected with the vibration belt; the exhaust hood is arranged above the vibration belt and is behind the discharge port of the film removing fan; and a residual film conveying channel is formed between the exhaust hood and the vibration belt.

11. The self-propelled residual film recycling integrated machine according to claim 10, wherein the film removing fan and the picking drum rotate in a same direction, and a rotating speed of the film removing fan is greater than a rotating speed of the picking drum.

12. The self-propelled residual film recycling integrated machine according to claim 1, wherein the round bale baler comprises a bottom belt, a back belt and a baling housing; the baling housing is connected with a frame body of the traveling chassis; both the bottom belt and the back belt are arranged in the baling housing, and the bottom belt and the back belt are arranged at an acute angle 8; the bottom belt is attached to a discharge port of the film removing and conveying device; an operating speed of the back belt is greater than an operating speed of the bottom belt, and the back belt is configured for turning the residual film on the bottom belt into a roll to form the residual film bale.

13. The self-propelled residual film recycling integrated machine according to claim 12, wherein a top end of the baling housing is hinged with the frame body of the traveling chassis, a bottom end of the baling housing is connected with the frame body of the traveling chassis through an unbaling cylinder, the unbaling cylinder is configured for applying a pushing force to the bottom end of the baling housing to make the baling housing overturn around a hinge axis at a top of the baling housing to make the residual film bale freely fall from the round bale baler.

14. The self-propelled residual film recycling integrated machine according to claim 13, further comprising a film unloading bracket, wherein the film unloading bracket is arranged at the tail of the traveling chassis and is located below the round bale baler, and the film unloading bracket is configured for receiving the residual film bale unloaded from the round bale baler.

15. The self-propelled residual film recycling integrated machine according to claim 14, wherein the film unloading bracket comprises a turnover cylinder, a bracket and a turnover frame; the bracket is arranged at a tail end of the traveling chassis; the turnover frame is arranged on the bracket, and a tail end of the turnover frame is hinged with the bracket; the turnover cylinder is connected between the tail end of the turnover frame and the bracket; and the turnover cylinder is configured for applying a pulling force to the tail end of the turnover frame to make the turnover frame overturn downwards around a hinge axis at the tail end of the turnover frame to unload the residual film bale from the turnover frame.

16. The self-propelled residual film recycling integrated machine according to claim 1, further comprising an air intake system, wherein the air intake system comprises a ventilation duct, an air inlet of the ventilation duct is arranged at a front upper of the cab, and an air outlet of the ventilation duct communicates with an air inlet of an engine on the traveling chassis to provide clean air for the engine.

17. The self-propelled residual film recycling integrated machine according to claim 1, wherein the cab is further assembled with an auxiliary driving system based on Beidou navigation, which is able to achieve a switching between unmanned driving and human-machine combined driving.

18. The self-propelled residual film recycling integrated machine according to claim 1, wherein the cab is further assembled with an operation quality monitoring system, which is configured to record a traveling track in an operation process and to perform video recording and storage of earth surface operation quality.

19. The self-propelled residual film recycling integrated machine according to claim 1, wherein the picking and impurity cleaning device comprises a rack, wherein an impurity cleaning and conveying device, a picking drum and a film lifting tooth assembly are sequentially arranged on the rack from front to back, wherein the film lifting tooth assembly is located diagonally downwards the picking drum, and comprises a film lifting pole and a plurality of film lifting teeth arranged on the film lifting pole, wherein the plurality of film lifting teeth and picking teeth on the picking drum are arranged in a mutual staggered manner, wherein the plurality of film lifting teeth are configured for penetrating the soil and lifting the residual film, wherein the picking teeth extending from the picking drum are configured for further lifting the residual film that has been lifted by the plurality of film lifting teeth and conveying the residual film to the film removing and conveying device, wherein the impurity cleaning and conveying device comprises an auger and a film blocking pole, wherein the film blocking pole is assembled between the auger and the picking drum and is configured for preventing the residual film from entering the auger, and wherein the auger is configured to convey impurities discharged when the residual film is picked up to one side of the machine.

* * * * *